United States Patent
Shah et al.

(10) Patent No.: US 11,375,536 B2
(45) Date of Patent: Jun. 28, 2022

(54) USER EQUIPMENT AND BASE STATION PARTICIPATING IN PRIORITIZED RANDOM ACCESS

(71) Applicant: Panasonic Intellectual Property Corporation of America, Torrance, CA (US)

(72) Inventors: Rikin Shah, Langen (DE); Hidetoshi Suzuki, Kanagawa (JP); Quan Kuang, Frankfurt (DE); Ming-Hung Tao, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 60 days.

(21) Appl. No.: 16/650,722

(22) PCT Filed: Sep. 14, 2018

(86) PCT No.: PCT/EP2018/074937
§ 371 (c)(1),
(2) Date: Mar. 25, 2020

(87) PCT Pub. No.: WO2019/063321
PCT Pub. Date: Apr. 4, 2019

(65) Prior Publication Data
US 2020/0275477 A1 Aug. 27, 2020

(30) Foreign Application Priority Data
Sep. 28, 2017 (EP) ..................................... 17193835

(51) Int. Cl.
*H04W 74/00* (2009.01)
*H04W 74/08* (2009.01)
(Continued)

(52) U.S. Cl.
CPC ..... *H04W 74/004* (2013.01); *H04W 74/0833* (2013.01); *H04W 52/04* (2013.01); *H04W 72/0413* (2013.01)

(58) Field of Classification Search
None
See application file for complete search history.

(56) References Cited

U.S. PATENT DOCUMENTS 10,397,958 B2 * 8/2019 Tsai .................. H04W 74/0833
10,813,131 B2 * 10/2020 Guo ...................... H04W 52/50
(Continued)

FOREIGN PATENT DOCUMENTS

WO 2017/016484 A1 2/2017

OTHER PUBLICATIONS

3GPP TR 38.801 V14.0.0, "$3^{rd}$ Generation Partnership Project; Technical Specification Group Radio Access Network; Study on new radio access technology; Radio access architecture and interfaces (Release 14)," Mar. 2017, 91 pages.
(Continued)

*Primary Examiner* — Ayaz R Sheikh
*Assistant Examiner* — Faiyazkhan Ghafoerkhan
(74) *Attorney, Agent, or Firm* — Seed IP Law Group LLP

(57) ABSTRACT

The present disclosure relates to a user equipment, with a processor which upon being triggered by a random access events, determines random access transmission parameters to be used by the UE for transmitting a random access message to its base station. At least part of the random access transmission parameters are determined based on the random access event that triggered the transmission of the random access message and on random access configuration information. The random access configuration information associates each of a plurality of random access events with a set of random access transmission parameters among a
(Continued)

plurality of random access transmission parameters usable by the user equipment to transmit a random access message to the base station. A transmitter of the UE transmits the random access message to the base station using the determined random access transmission parameters.

18 Claims, 6 Drawing Sheets

(51) Int. Cl.
*H04W 52/04* (2009.01)
*H04W 72/04* (2009.01)

(56) References Cited

U.S. PATENT DOCUMENTS

| | | | | |
|---|---|---|---|---|
| 2013/0242730 A1* | 9/2013 | Pelletier | ............ | H04W 74/0833 370/230 |
| 2013/0301541 A1* | 11/2013 | Mukherjee | ........ | H04W 74/0833 370/329 |
| 2015/0289292 A1* | 10/2015 | Sun | ..................... | H04L 27/2613 370/329 |
| 2015/0326484 A1* | 11/2015 | Cao | ..................... | H04W 74/002 370/329 |
| 2016/0135155 A1* | 5/2016 | Al-Shalash | ....... | H04W 72/1284 370/329 |
| 2017/0135135 A1* | 5/2017 | Pelletier | ................ | H04L 1/0072 |
| 2017/0311254 A1* | 10/2017 | Ly | ..................... | H04W 52/0203 |
| 2018/0270869 A1* | 9/2018 | Tsai | ....................... | H04W 76/27 |
| 2018/0376461 A1* | 12/2018 | Dinan | ................... | H04L 5/0025 |
| 2019/0053285 A1* | 2/2019 | Martin | ............. | H04W 74/0833 |
| 2019/0268841 A1* | 8/2019 | Ly | ........................ | H04H 20/38 |
| 2019/0394807 A1* | 12/2019 | Xiao | .................... | H04W 74/08 |

OTHER PUBLICATIONS

3GPP TR 38.804 V14.0.0, "3rd Generation Partnership Project; Technical Specification Group Radio Access Network; Study on New Radio Access Technology; Radio Interface Protocol Aspects (Release 14)," Mar. 2017, 57 pages.
3GPP TR 38.913 V14.3.0, "3rd Generation Partnership Project; Technical Specification Group Radio Access Network; Study on Scenarios and Requirements for Next Generation Access Technologies; (Release 14)," Jun. 2017, 39 pages.
3GPP TS 24.301 V15.0.1, "3rd Generation Partnership Project; Technical Specification Group Core Network and Terminals; Non-Access-Stratum (NAS) protocol for Evolved Packet System (EPS); Stage 3 (Release 15)," Sep. 2017, 496 pages.
3GPP TS 36.321 V14.1.0, "3rd Generation Partnership Project; Technical Specification Group Radio Access Network; Evolved Universal Terrestrial Radio Access (E-UTRA); Medium Access Control (MAC) protocol specification (Release 14)," Dec. 2016, 98 pages.
3GPP TS 36.321 V14.3.0, "3rd Generation Partnership Project; Technical Specification Group Radio Access Network; Evolved Universal Terrestrial Radio Access (E-UTRA); Medium Access Control (MAC) protocol specification (Release 14)," Jun. 2017, 107 pages.
3GPP TS 36.331 V14.4.0, "3rd Generation Partnership Project; Technical Specification Group Radio Access Network; Evolved Universal Terrestrial Radio Access (E-URTA); Radio Resource Control (RRC); Protocol specification (Release 14)," Sep. 2017, 753 pages.
3GPP TS 36.413 V14.3.0, "3rd Generation Partnership Project; Technical Specification Group Radio Access Network; Evolved Universal Terrestrial Radio Access Network (E-UTRAN); S1 Application Protocol (S1AP) (Release 14)," Jun. 2016, 347 pages.
3GPP TS 38.211 V1.0.0, "3rd Generation Partnership Project; Technical Specification Group Radio Access Network; NR; Physical channels and modulation (Release 15)," Sep. 2017, 37 pages.
3GPP TS 38.300 V0.4.1, "3rd Generation Partnership Project; Technical Specification Group Radio Access Network; NR; NR and NG-RAN Overall Description; Stage 2 (Release 15)," Jun. 2017, 55 pages.
3GPP TS 38.300 V1.0.0, 3rd Generation Partnership Project; Technical Specification Group Radio Access Network; NR; NR and NG-RAN Overall Description; Stage 2 (Release 15), Sep. 2017, 59 pages.
Extended European Search Report, dated Mar. 13, 2018, for European Application No. 17193835.0-1215, 10 pages.
Huawei, HiSilicon, "Further discussion on prioritized RACH," R1-1705117, Agenda Item: 10.3.1.4, 3GPP TSG-RAN WG2 Meeting #98, Hangzhou, China, May 15-19, 2017, 4 pages.
Intel Corporation, "Differentiation of RACH parameters," R2-1707029 (Revision of R2-1704782), Agenda item: 10.3.1.4.1, 3GPP TSG RAN WG2#NR_AdHoc#2, Qingdao, China, Jun. 27-29, 2017, 4 pages.
International Search Report, dated Nov. 19, 2018, for International Application No. PCT/EP2018/074937, 2 pages.
Qualcomm, AsusTek, CATT, Ericsson, Huawei, Intel, Interdigital, OPPO, "Converged proposal for prioritized random access for NR," R2-1708720, Agenda item: 10.3.1.4.1, 3GPP TSG_RAN WG2 Meeting RAN2 #99, Berlin, Germany, Aug. 21-25, 2017, 3 pages.
Qualcomm Incorporated, "Prioritized random access in NR," R2-17xxxx ((R2-1704901), Agenda item: 10.3.1.4, 3GPP TSG-RAN WG2 Meeting #98, Hangzhou, China, May 15-19, 3 pages.
Chinese Office Action, dated Nov. 25, 2021, for Chinese Application No. 201880063604.7. (with English translation) (20 pages).
Ericsson, "Differentiation on RACH parameters," R2-1708191, Agenda Item: 10.3.1.4.1, 3GPP TSG-RAN WG2 #99, Berlin, Germany, Aug. 21-25, 2017. (4 pages).
CATT, "Considerations on priority access," R2-1707926, Agenda Item: 10.3.1.4.1, 3GPP TSG-RAN WG2 #99, Berlin, Germany, Aug. 21-25, 2017, (5 pages).
Japanese Office Action, dated Mar. 1, 2022, for Japanese Patent 2020-516390, (12 pages).

* cited by examiner

USER EQUIPMENT AND BASE STATION PARTICIPATING IN PRIORITIZED RANDOM ACCESS

BACKGROUND

Technical Field

The present disclosure is directed to methods, devices and articles in communication systems, such as, 3GPP communication systems.

Description of the Related Art

Currently, the 3rd Generation Partnership Project (3GPP) works at the next release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "Study on New Radio Access Technology" involving RAN1, RAN2, RAN3 and RAN4 was approved and is expected to become the Release 15 work item that defines the first 5G standard. The aim of the study item is to develop a "New Radio (NR)" access technology (RAT), which operates in frequency ranges up to 100 GHz and supports a broad range of use cases, as defined during the RAN requirements study (see e.g., 3GPP TR 38.913 "Study on Scenarios and Requirements for Next Generation Access Technologies", current version 14.3.0 available at www.3gpp.org and incorporated herein its entirety by reference).

One objective is to provide a single technical framework addressing all usage scenarios, requirements and deployment scenarios defined in TR 38.913, at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks. The services eMBB and URLLC are similar in that they both demand a very broad bandwidth, however are different in that the URLLC service requires ultra-low latencies.

A second objective is to achieve forward compatibility. Backward compatibility to Long Term Evolution (LTE, LTE-A) cellular systems is not required, which facilitates a completely new system design and/or the introduction of novel features.

The fundamental physical layer signal waveform will be based on OFDM, with potential support of a non-orthogonal waveform and multiple access. For instance, additional functionality on top of OFDM such as DFT-S-OFDM, and/or variants of DFT-S-OFDM, and/or filtering/windowing is further considered. In LTE, CP-based OFDM and DFT-S-OFDM are used as waveform for downlink and uplink transmission, respectively. One of the design targets in NR is to seek a common waveform as much as possible for downlink, uplink and sidelink.

Besides the waveform, some basic frame structure(s) and channel coding scheme(s) will be developed to achieve the above-mentioned objectives. The study shall also seek a common understanding on what is required in terms of radio protocol structure and architecture to achieve the above-mentioned objectives. Furthermore, the technical features which are necessary to enable the new RAT to meet the above-mentioned objectives shall be studied, including efficient multiplexing of traffic for different services and use cases on the same contiguous block of spectrum.

Since the standardization for the NR of $5^{th}$ Generation systems of 3GPP is at the very beginning, there are several issues that remain unclear. For instance, there has been discussion on supporting a prioritization mechanism for the random access procedure performed between user equipments and base stations. However, definite agreements on how to effectively implement a prioritized random access have not been reached.

BRIEF SUMMARY

One non-limiting and exemplary embodiment facilitates providing an improved random access procedure in which different entities (UE, gNBs) are participating.

In one general first aspect, the techniques disclosed here feature a user equipment which comprises a processor and a transmitter as follows. A processor, upon being triggered by one of a plurality of random access events, determines random access transmission parameters to be used for transmitting a random access message to a base station that controls a radio cell of a mobile communication system in which the user equipment is located. At least part of the random access transmission parameters are determined based on the random access event that triggered the transmission of the random access message and on random access configuration information. The random access configuration information associates each of a plurality of random access events with a set of random access transmission parameters among a plurality of random access transmission parameters usable by the user equipment to transmit a random access message to the base station. A transmitter transmits the random access message to the base station using the determined random access transmission parameters.

In one general first aspect, the techniques disclosed here feature a base station which comprises a receiver, a processor and a transmitter as follows. A receiver receives a random access message from a user equipment which is located in the radio cell of a mobile communication system controlled by the base station, the random access message being transmitted by the user equipment upon being triggered by one of a plurality of random access events. A processor determines random access transmission parameters used by the user equipment to transmit the random access message, and determines a backoff parameter to be used by the user equipment to determine a period of time the user equipment has at least to wait before starting another random access channel procedure. A transmitter transmits, in response to the transmitted random access message, a random access response message to the user equipment that includes the determined backoff parameter.

In one general second aspect, the techniques disclosed here feature a user equipment which comprises a transmitter, a receiver and a processor as follows. A transmitter, upon being triggered by one of a plurality of random access events, transmits a random access message to a base station controlling a radio cell of a mobile communication system in which the user equipment is located. A receiver receives from the base station, in response to the transmitted random access message, a random access response message including a backoff index. The processor determines a backoff time value, indicating a period of time the user equipment has at least to wait before starting another random access channel procedure, based on the received backoff index and on a backoff index table, which associates different backoff time values with backoff indexes and with at least one or more of the plurality of random access events that may trigger the transmission of a random access message.

It should be noted that general or specific embodiments may be implemented as a system, a method, an integrated circuit, a computer program, a storage medium, or any selective combination thereof.

Additional benefits and advantages of the disclosed embodiments will be apparent from the specification and Figures. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

In the following exemplary embodiments are described in more detail with reference to the attached figures and drawings.

DETAILED DESCRIPTION

Basis of the Present Disclosure

5G NR System Architecture and Protocol Stacks

As presented in the background section, 3GPP is working at the next release for the $5^{th}$ generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology". Results and agreements are collected in the Technical Report TR 38.804 v14.0.0, incorporated herein in its entirety by reference.

Figure 1:
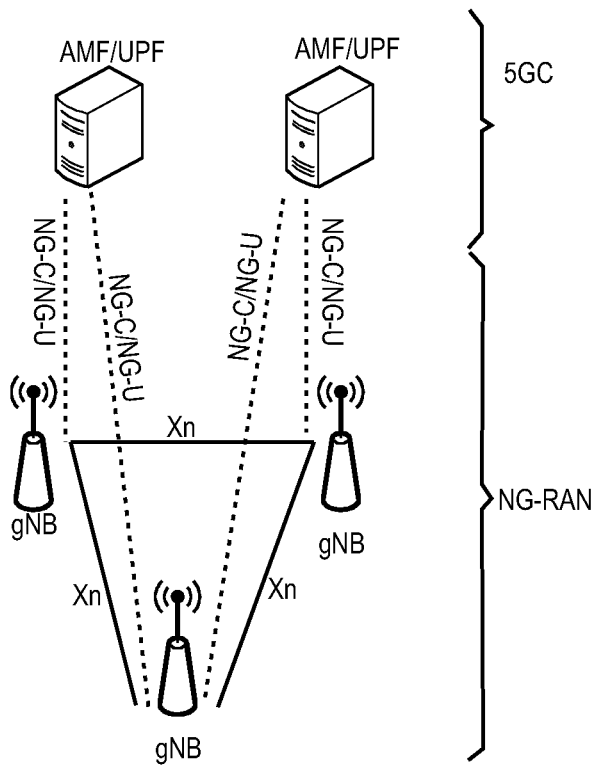
FIG. 1 shows an exemplary architecture for a 3GPP NR system.

Among other things, there has been a provisional agreement on the overall system architecture. The NG-RAN (Next Generation—Radio Access Network) consists of gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) by means of the NG-C interface and to the UPF (User Plane Function) by means of the NG-U interface. The NG-RAN architecture is illustrated in FIG. 1, as taken from the TS 38.300 v.0.4.1, section 4 incorporated herein by reference.

Figure 2:
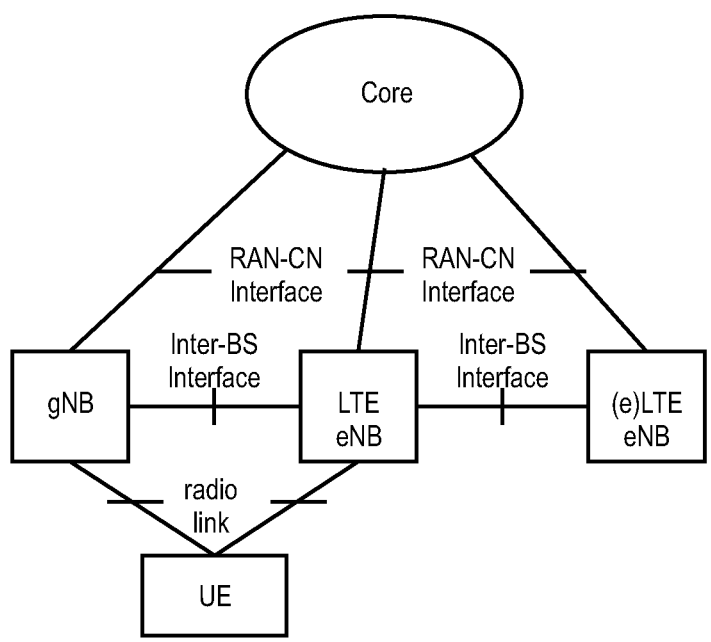
FIG. 2 shows an exemplary user and control plane architecture for the LTE eNB, gNB, and UE.

Various different deployment scenarios are currently being discussed for being supported, as reflected e.g., in 3GPP TR 38.801 v14.0.0 incorporated herein by reference in its entirety. For instance, a non-centralized deployment scenario (section 5.2 of TR 38.801; a centralized deployment is illustrated in section 5.4) is presented therein, where base stations supporting the 5G NR can be deployed. FIG. 2 illustrates an exemplary non-centralized deployment scenario and is based on FIG. 5.2.-1 of said TR 38.801, while additionally illustrating an LTE eNB as well as a user equipment (UE) that is connected to both a gNB and an LTE eNB (which is to be understood as an eNB according to previous 3GPP standard releases such as for LTE and LTE-A). As mentioned before, the new eNB for NR 5G may be exemplarily called gNB.

An eLTE eNB, as exemplarily defined in TR 38.801, is the evolution of an eNB that supports connectivity to the EPC (Evolved Packet Core) and the NGC (Next Generation Core).

The user plane protocol stack for NR is currently defined in TS 38.300 v0.4.1, section 4.4.1. The PDCP (Packet Data Convergence Protocol), RLC (Radio Link Control) and MAC (Medium Access Control) sublayers are terminated in the gNB on the network side. Additionally, a new access stratum (AS) sublayer (SDAP, Service Data Adaptation Protocol) is introduced above PDCP as described in sub-clause 6.5 of S TS 38.300 v1.0.0. The control plane protocol stack for NR is defined in TS 38.300, section 4.4.2. An overview of the Layer 2 functions is given in sub-clause 6, of TS 38.300. The functions of the PDCP, RLC and MAC sublayers are listed in sub-clauses 6.4, 6.3, and 6.2 of TS 38.300. The functions of the RRC layer are listed in sub-clause 7 of TS 38.300. The mentioned sub-clauses of TS 38.300 are incorporated herein by reference.

The new NR layers exemplarily assumed at present for the 5G systems may be based on the user plane layer structure currently used in LTE(-A) communication systems. However, it should be noted that no final agreements have been reached at present for all details of the NR layers.

As identified in TR 38.913, use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1$-$10^{-5}$ within 1 ms). Finally, mMTC requires high connection density (1,000,000 devices/km² in an urban environment), large coverage in harsh environments, and extremely long-life battery for low cost devices (15 years).

Figure 3:
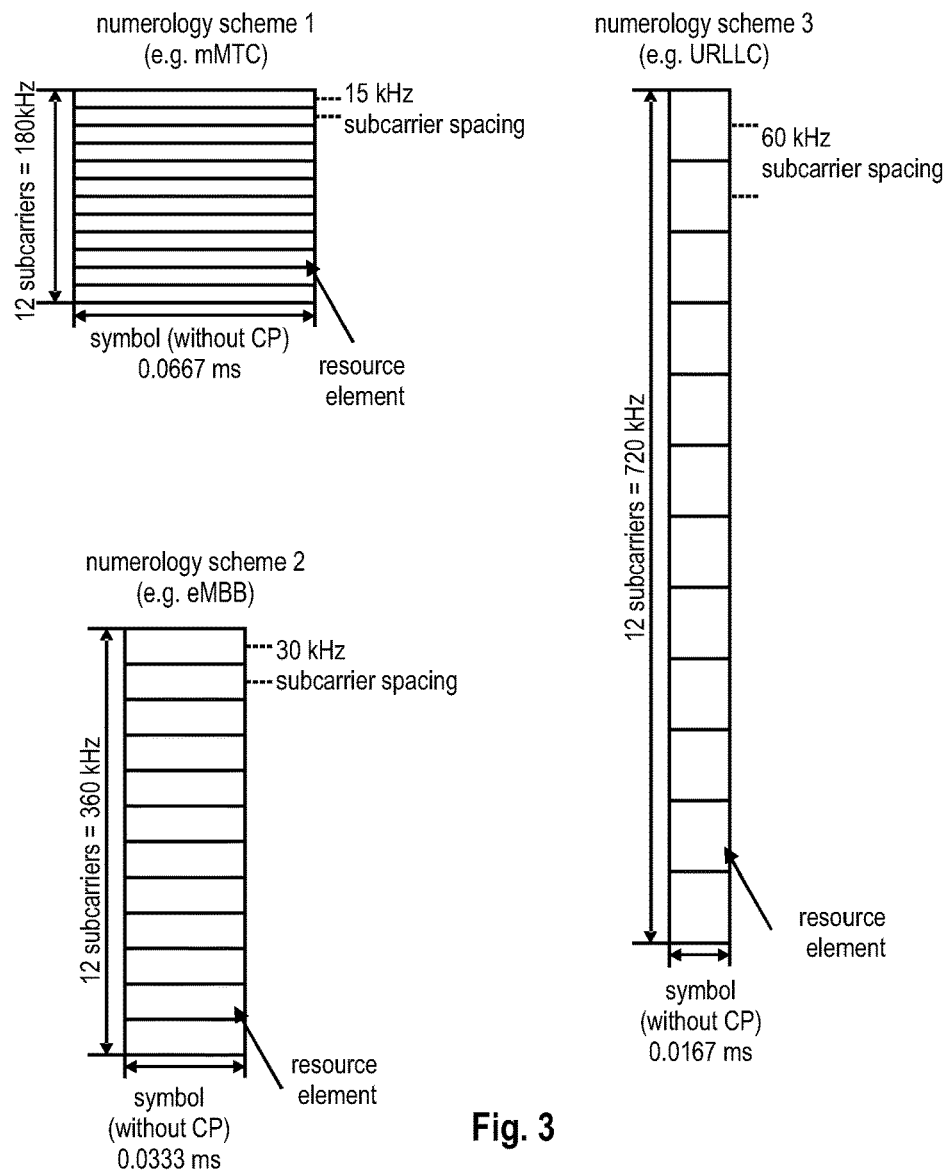
FIG. 3 illustrates different subcarrier spacings 15 kHz, 30 kHz, and 60 kHz and the resulting symbols durations.

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may require a shorter symbol duration (and thus larger subcarrier spacing) and/or fewer symbols per scheduling interval (aka, TTI) than an mMTC service. Furthermore, deployment scenarios with large channel delay spreads require a longer CP duration than scenarios with short delay spreads. The subcarrier spacing should be optimized accordingly to retain the similar CP overhead. In 3GPP RAN1#84bis meeting (Busan, April 2016), it was agreed that it is necessary for NR to support more than one value of subcarrier-spacing. The values of subcarrier-spacing are derived from a particular value of subcarrier-spacing multiplied by N where N is an integer. In the RAN1 meeting RAN1#85 (Nanjing, May 2016) it was concluded as a working assumption that the LTE-based numerology including 15 kHz subcarrier spacing is the baseline design for the NR numerology. For the scaling factor N, $N=2^n$ was concluded as the baseline design assumption for the NR numerology. The down selection of numerology candidates might be done in future meetings. Correspondingly, subcarrier spacings of 15 kHz, 30 kHz, 60 kHz . . . are being considered at the moment. FIG. 3 exemplarily illustrates three different subcarrier spacings (15 kHz, 30 kHz, and 60 kHz) and the corresponding symbol duration. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier, a resource grid of subcarriers and OFDM symbols is defined respectively for uplink and downlink. Each element in the resource grid is called a resource element and is identified based on the frequency index in the frequency domain and the symbol position in the time domain. Provisional definitions are currently being prepared in 3GPP TS 38.211 v1.0.0 incorporated herein by reference.

LTE System Information Acquisition

In LTE, system information is structured by means of system information blocks (SIBs), each of which contains a set of functionally related parameters. The MIB (master information block) includes a limited number of the most frequently transmitted parameters which are essential for an initial access of the UE to the network. There are system information blocks of different types SIB1-SIB18 currently defined in LTE to convey further parameters, e.g., SIB1 includes parameters needed to determine if a cell is suitable for cell selection, as well as information about the time domain scheduling of the other SIBs, SIB2, for example, includes common and shared channel information.

Three types of RRC (Radio Resource Control) messages can be used to transfer the system information, the MIB, the SIB1 message and SI messages. SIBs other than SIB1 are transmitted within system information messages (SI messages), of which there are several and which include one or more SIBs which have the same scheduling requirements (e.g., the same transmission periodicity). Depending on the content of the SI messages, the UE has to acquire different SI messages in idle and connected states; e.g., the $3^{rd}$ SI message with SIB5 (inter-frequency cell reselection information) needs to be acquired in idle state only.

More information on the system information can be found in the 3GPP Technical Specification TS 36.331 v14.4.0, section 5.2 "System information" incorporated herein in its entirety by reference.

NR System Information Acquisition

In 5G NR it is currently envisioned (although not finally agreed upon) that system information is generally divided into minimum system information and other system information. The minimum system information is periodically broadcast and comprises basic information required for initial access to a cell (such as System Frame Number, list of PLMN, Cell ID, cell camping parameters, RACH parameters). The minimum system information may further comprise information for acquiring any other SI broadcast periodically or provisioned via on-demand basis, e.g., suitable scheduling information in said respect. The scheduling information may for instance include as necessary the SIB type, validity information, SI periodicity and SI-window information. Correspondingly, the other system information shall encompass everything that is not broadcast in the minimum system information, e.g., cell-reselection neighboring cell information.

Figure 4:
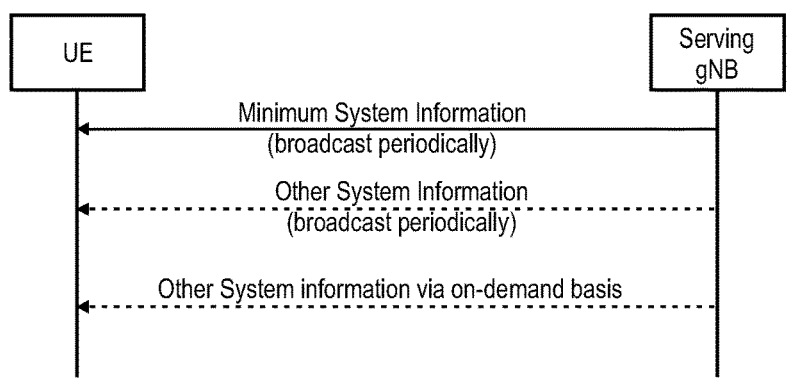
FIG. 4 illustrates the system information acquisition message exchange as currently discussed for 5 g NR.

The other SI may either be broadcast or provisioned in a dedicated manner, either triggered by the network or upon request from the UE, as illustrated in FIG. 4. The other SI can be broadcast at a configurable periodicity and for a certain duration. It is a network decision whether the other SI is broadcast or delivered through dedicated UE-specific RRC signaling.

For the other SI that is actually required by the UE, before the UE sends the other SI request, the UE needs to know whether it is available in the cell and whether it is broadcast or not. For the UE in RRC_CONNECTED state, dedicated RRC signaling can be e.g., used for the request and delivery of the other SI.

In legacy LTE, the UE is always required to (re-)acquire system information when cell change occurs, and the UE is also required to re-acquire all the system information when the system information is changed (e.g., indicated by paging or an incremented, i.e., changed, value tag). For the new system in 5G NR, it is generally desired to reduce the need to re-acquire system information by identifying stored system information with a specific index/identifier, which is broadcast together with the minimum system information. It is assumed that some system information valid in one cell may be valid also in other cells. For example, the common radio resource configuration, the Access Class barring information, the UL carrier frequency and bandwidth, and the MB SFN (Multimedia Broadcast Single-Frequency Network) subframe configuration may be valid among multiple adjacent cells.

There are however no final agreements with regard to the system information in 5G NR.

RACH Procedure

No final agreement has been reached with regard to the RACH (Random Access Channel) procedure in 5G NR. As described in section 9.2 of TR 38.804 v14.0.0, incorporated herein by reference, the NR RACH procedure may support both contention-based and contention-free random access, in the same or similar manner as defined for LTE. Also, the design of the NR RACH procedure shall support a flexible message-3 size, similar as in LTE.

Figure 5:
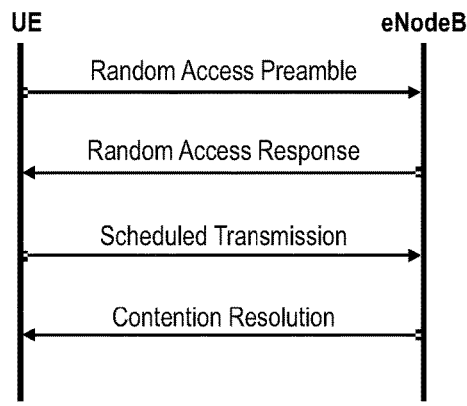
FIG. 5 illustrates the messages exchanged between an eNB and a UE when performing a contention-based RACH procedure.

The LTE RACH procedure will be described in the following in more detail, with reference to FIGS. 5 and 6. A mobile terminal in LTE can only be scheduled for uplink transmission, if its uplink transmission is time synchronized. Therefore, the Random Access Channel (RACH) procedure plays an important role as an interface between non-synchronized mobile terminals (UEs) and the orthogonal transmission of the uplink radio access. For instance, the Random Access in LTE is used to achieve uplink time synchronization for a user equipment which either has not yet acquired, or has lost, its uplink synchronization. Once a user equipment has achieved uplink synchronization, the eNodeB can schedule uplink transmission resources for it. One scenario relevant for random access is where a user equipment in RRC_CONNECTED state, handing over from its current serving cell to a new target cell, performs the Random Access Procedure in order to achieve uplink time-synchronization in the target cell.

LTE offers two types of random access procedures allowing access to be either contention based, i.e., implying an inherent risk of collision, or contention free (non-contention based). A detailed description of the LTE random access procedure can be also found in 3GPP TS 36.321, section 5.1. v14.1.0 incorporated herein by reference.

In the following the LTE contention-based random access procedure is being described in more detail with respect to FIG. 5. This procedure consists of four "steps". First, the user equipment transmits a random access preamble on the Physical Random Access Channel (PRACH) to the eNodeB (i.e., message 1 of the RACH procedure). After the eNodeB has detected a RACH preamble, it sends a Random Access Response (RAR) message (message 2 of the RACH procedure) on the PDSCH (Physical Downlink Shared Channel) addressed on the PDCCH with the (Random Access) RA-RNTI identifying the time-frequency slot in which the preamble was detected. If multiple user equipments transmitted the same RACH preamble in the same PRACH resource, which is also referred to as collision, they would receive the same random access response message. The RAR message may convey the detected RACH preamble, a timing alignment command (TA command) for synchronization of subsequent uplink transmissions, an initial uplink resource assignment (grant) for the transmission of the first scheduled transmission and an assignment of a Temporary Cell Radio Network Temporary Identifier (T-CRNTI). This T-CRNTI is used by eNodeB to address the mobile(s) whose RACH preamble was detected until the RACH procedure is finished, since the "real" identity of the mobile at this point is not yet known by the eNodeB.

The user equipment monitors the PDCCH for reception of the random access response message within a given time window, which is configured by the eNodeB. In response to the RAR message received from the eNodeB, the user equipment transmits the first scheduled uplink transmission on the radio resources assigned by the grant within the random access response. This scheduled uplink transmission conveys the actual random access procedure message like, for example, an RRC connection request or a buffer status report.

In case of a preamble collision having occurred in the first of the RACH procedure, i.e., multiple user equipments have sent the same preamble on the same PRACH resource, the colliding user equipments will receive the same T-CRNTI within the random access response and will also collide in the same uplink resources when transmitting their scheduled transmission in the third step of the RACH procedure. In case the scheduled transmission from one user equipment is successfully decoded by eNodeB, the contention remains unsolved for the other user equipment(s). For resolution of this type of contention, the eNode B sends a contention resolution message (a fourth message) addressed to the C-RNTI or Temporary C-RNTI.

Figure 6:
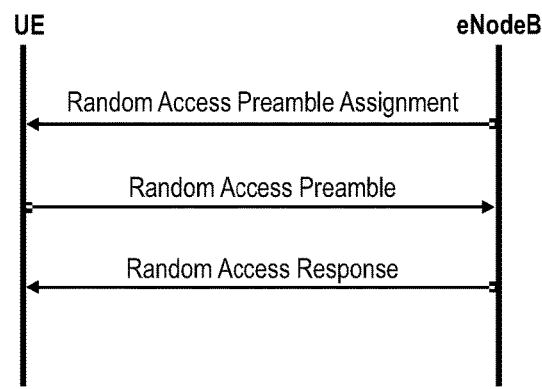
FIG. 6 illustrates the messages exchanged between an eNB and a UE when performing a contention-free RACH procedure.

FIG. 6 is illustrating the contention-free random access procedure of 3GPP LTE, which is simplified in comparison to the contention-based random access procedure. The eNodeB provides in a first step the user equipment with the preamble to use for random access so that there is no risk of collisions, i.e., multiple user equipments transmitting the same preamble. Accordingly, the user equipment is subsequently sending the preamble which was signaled by eNodeB in the uplink on a PRACH resource. Since the case that multiple UEs are sending the same preamble is avoided for a contention-free random access, essentially, a contention-free random access procedure is finished after having successfully received the random access response by the UE.

Thus, a similar or same RACH procedure as just explained in connection with FIGS. 5 and 6 could be adopted in the future for the new radio technology of 5G. However, 3GPP is also studying a two-step RACH procedure for 5G NR, where a message 1, that corresponds to messages 1 and 3 in the four-step RACH procedure, is transmitted at first. Then, the gNB will respond with a message 2, corresponding to messages 2 and 4 of the LTE RACH procedure. Due to the reduced message exchange, the latency of the two-step RACH procedure may be reduced compared to the four-step RACH procedure. The radio resources for the messages are optionally configured by the network.

Furthermore, 3GPP has generally agreed that NR communication system should support prioritization of the random access, however without agreeing on the details on how this can be achieved in detail. This could involve the possibility to differentiate between different backoff parameters and power ramping values.

In contrast, in LTE systems the UEs perform basically the same random access procedure with the same set of configured parameters, e.g., a common backoff value, a common power ramping parameter and the radio resources for the PRACH (Physical Random Access Channel). Thus, a UE performs the random access procedure without any consideration of the purpose of the access request, i.e., why the random access procedure is performed in the first place.

In contrast thereto, prioritization of the random access procedure of different UEs is motivated by the need to support a broader set of service requirements in future NR systems and also by the desire to improve the robustness of the system. In more detail, different user services currently handled by the UE can also benefit from the random access prioritization. For instance, random access triggered for the URLLC service would benefit from having a fast access with a lower delay than needed for random access procedure triggered in the context of an eMBB service.

Further, different types of random access events have different access delay requirements, such that random access requests triggered in the UE by certain random access (RA) events should have higher priority than others. For instance, an RA event that is triggered by an RRC Connection Re-establishment should be handled with a shorter delay, than e.g., an RA event triggered by a UE trying to get initial access. Similarly, a UE in RRC_Connected state trying to use the random access procedure to get synchronized again could be given a higher priority than e.g., a UE in RRC_Idle trying to use random access to get initial access.

Moreover, random access requests triggered by certain RA events (for instance random access event 5, see below) may require further specific configuration parameters, such as a different numerology for sending the second message MSG2 from the gNB to the UE (see FIG. 5). Another aspect of the random access prioritization may involve that certain premium users may require faster access and higher success rate that other general users (e.g., having higher QoS, Quality of Service, parameters than other general users).

The following random access events are currently defined:

(Event 1): Initial access from RRC_IDLE;
(Event 2): RRC Connection Re-establishment procedure;
(Event 3): Handover;
(Event 4): DL data arrival during RRC_CONNECTED requiring random access procedure, e.g., when UL synchronization status is "non-synchronized";
(Event 5): UL data arrival during RRC_CONNECTED requiring random access procedure, e.g., when UL synchronization status is "non-synchronized" or there are no PUCCH resources for SR available.
(Event 6): Transition from RRC_INACTIVE to RRC_CONNECTED
(Event 7): Beam Recovery Events 1 to 6 that trigger a random access procedure are already known from LTE system, whereas Event 7 (beam recovery) is currently being discussed to be newly introduced for 5G NR systems.

Although random access prioritization has been generally agreed by 3GPP, no detailed solutions are yet available nor suggested. Correspondingly, there is a need for an improved random access procedure which allows prioritization.

Detailed Description of Present Disclosure

In the following, UEs, base stations, and procedures to meet this need will be described for the new radio access technology envisioned for the 5G mobile communication systems. Different implementations and variants will be explained as well. The following detailed disclosure was facilitated by the discussions and findings as described in the previous section "Basis of the present disclosure" and may be based at least on part thereof.

In general, it should be however noted that only few things have been actually agreed on with regard to the 5G cellular communication system such that many assumptions have to be made in the following so as to be able to explain the principles underlying the present disclosure in a clear and understandable manner. These assumptions are however to be understood as merely examples that should not limit the scope of the disclosure. A skilled person will be aware that the principles of the following disclosure and as laid out in the claims can be applied to different scenarios and in ways that are not explicitly described herein.

Moreover, terms of the procedures, entities, layer layers etc. used in the following are closely related to LTE/LTE-A systems or to terminology used in the current study items for 3GPP 5G, even though specific terminology to be used in the context of the new radio access technology for the next 3GPP 5G communication systems is not fully decided yet. Thus, terms could be changed in the 3GPP normative phase, without affecting the functioning of the embodiments of the disclosure. Consequently, a skilled person is aware that the disclosure and its scope of protection should not be restricted to particular terms exemplary used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently-used terminology for 5G NR is gNB.

Figure 7:
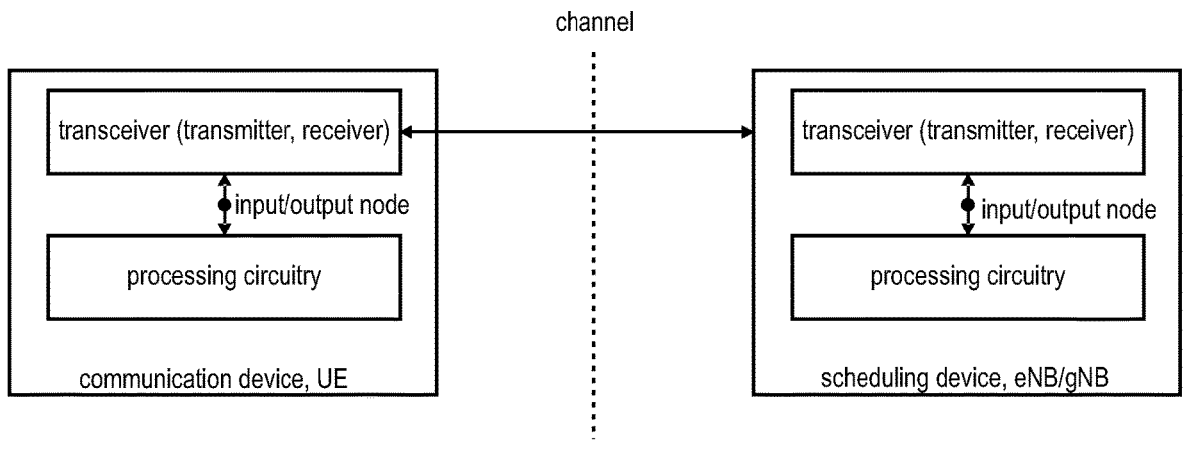
FIG. 7 illustrates the exemplary and simplified structure of a UE and an eNB.

FIG. 7 illustrates a general, simplified and exemplary block diagram of a user equipment (also termed communication device) and a scheduling device (here assumed to be located in the base station, e.g., the LTE eNB or the gNB in 5G NR). The UE and eNB/gNB are communicating with each other over a (wireless) physical channel respectively using the transceiver.

The communication device may comprise a transceiver and processing circuitry. The transceiver in turn may comprise a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data which is further processed by the processing circuitry. The processing circuitry may also be responsible for performing processes of determining, deciding, calculating, measuring, etc. The transmitter may be responsible for performing the process of transmitting and other processes related thereto. The receiver may be responsible for performing the process of receiving and other processes related thereto.

In the present case as will become apparent from the below description of the different embodiments and variants thereof, the processor can thus be exemplarily configured to determine certain transmission parameters that are needed for the process of transmitting the messages of the RACH procedure. Another example refers to the transmitter being in turn configured to be able to transmit the messages of the RACH procedure, e.g., using the transmission parameters determines by the processor. Conversely, a receiver can in turn be configured to be able to receive messages of the RACH procedure.

Figure 8:
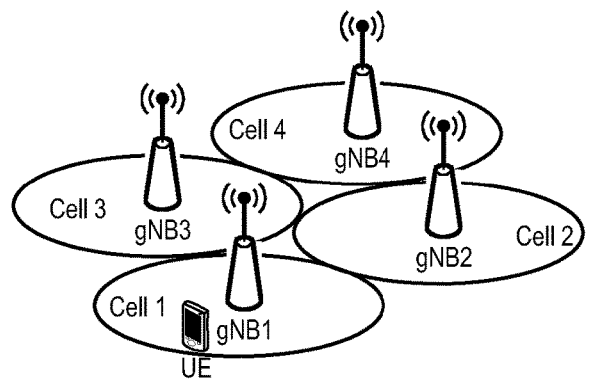
FIG. 8 illustrates a simple scenario with a UE being connected to a gNB1, and having neighboring cells respectively controlled by different gNBs.

A simple and exemplary scenario is assumed in the following. As illustrated in FIG. 8 it is assumed that a UE is located in the coverage area of radio cell 1 which is controlled by gNB1. There are neighboring radio cells 2, 3, and 4 respectively controlled by gNB2, gNB3, and gNB4.

One important procedure to be performed for various reasons is the random access channel, RACH, procedure (can also be termed random access procedure or RA procedure) between the UE and the gNB. Details on the random access procedure as known from LTE and as currently discussed for 5G NR are provided in previous sections, and reference is made thereto. For the purpose of describing and explaining the underlying concepts of the embodiments presented below, a 4-step contention-based random access procedure is exemplarily assumed. It should be noted however that the concepts can also be applied to different random access procedures, such as a shorter 2-step procedure or the contention-free random access procedure.

Embodiment 1

An improved random access procedure will be described in the following according to the first embodiment which allows the differentiation between PRACH resources used by the UE, thus allowing to prioritize the random access procedure as necessary.

Prioritization of the random access procedure in this respect is to be understood for instance in that the backoff time value and/or the transmit power value to be used by the UE for the random access procedure can be adapted to better reflect the priority (and thus of facilitate meeting certain requirements) imposed e.g., by the UE or by the random access event triggering the random access. The backoff parameter is a parameter used to determine the period of time the UE has to wait between a previous (possibly unsuccessful) random access procedure and the start of a new random access procedure (by transmitting the first random access message with the preamble). The backoff parameter is, for example, provided by the gNB to the UE in case a collision is detected in the gNB, i.e., several UEs transmitted the same preamble using the same PRACH resources to the gNB. The backoff parameter is already known in LTE e.g., in TS 36.321 v14.3.0 in corresponding sections 5.1.4 and 7.2, incorporated herein by reference. The transmit power value indicates a value on which basis the UE determines with how much power it can transmit the first random access message of the random access procedure to the gNB, thus influencing the robustness of the scheduled transmission itself and also the chances of success in case of colliding RACH procedures between several UEs.

Consequently, prioritization of the random access procedure is particularly helpful in cases where collisions between different UEs using the same random access resources occur. The gNB, in those instances where it identifies collisions between random access procedure is performed by different UEs, may prioritize the further performance of the random access procedures of the different UEs by selecting the appropriate backoff parameter and assigning same to the different UEs.

According to this embodiment, the UE participates in the prioritization of the random access procedure by selecting appropriate PRACH resources (being indicative of prioritization criteria) which the gNB can then differentiate in order to provide a backoff parameter to the UE to prioritize further random access. In order to implement the selection by the UE and the determination by the gNB, it is assumed that, at both the UE-side and the gNB-side, random access configuration information is available, associating specific PRACH resources (also termed random access transmission parameters) with specific prioritization criteria (e.g., circumstances on which basis the random access should be prioritized).

For example, the random access transmission parameters may include one or more of the following:
a random access preamble sequence, transmitted with the random access message,
time and frequency of the radio channel resources that are to be used by the UE when transmitting the random access message to the gNB,
a transmit power value, to be used by the UE when transmitting the random access message to the gNB.

Figure 9:
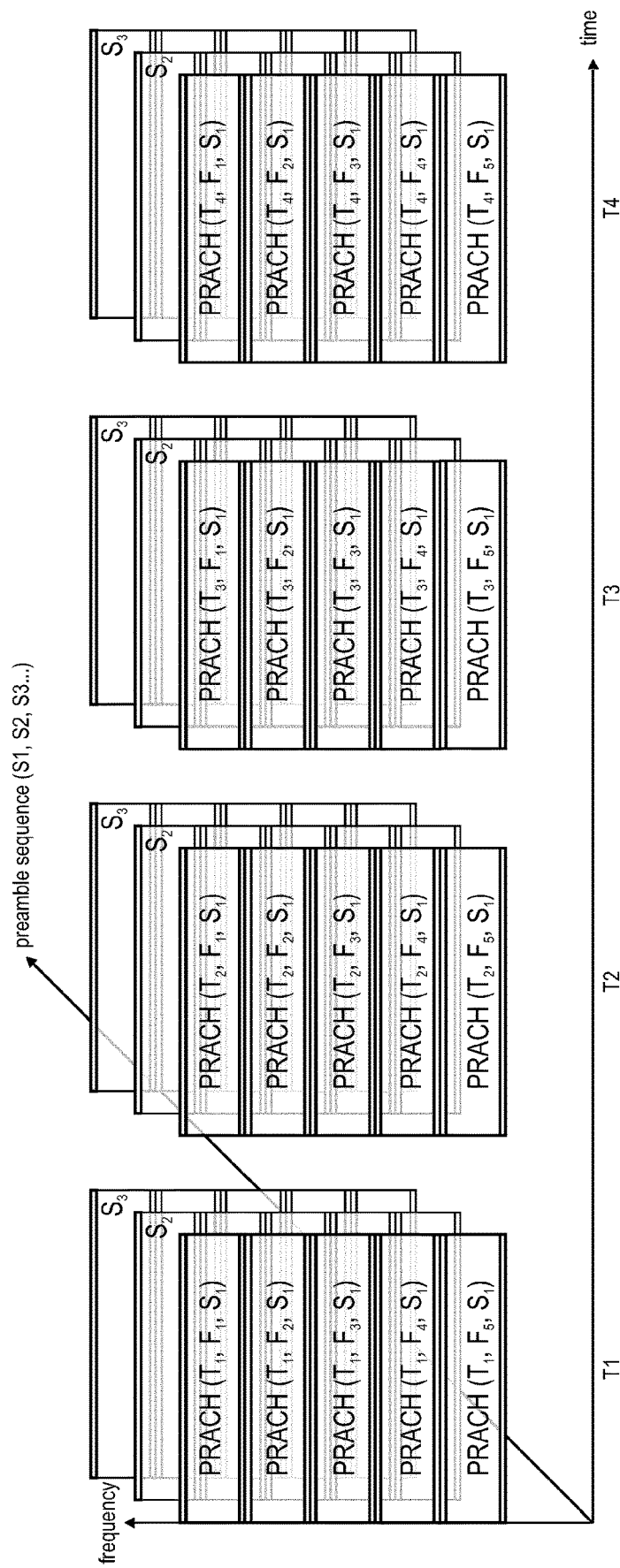
FIG. 9 illustrates different PRACH resources, including three dimensions thereof being time, frequency of the radio resources and the preamble sequences.

An exemplary and simplified illustration of these random access transmission parameters is presented in FIG. 9. As apparent therefrom, it is exemplarily assumed that the PRACH resources are distinguishable based on the time (T1, T2, T3, T4) and frequency (F1, F2, F3, F4, F5) of the radio resources, as well as by the preamble sequence (S1, S2, S3) transmitted by the UE with the first RA message (three dimensions in the diagram of FIG. 9). The reader should be aware that the illustration and distinguishing parameters are merely examples, and less or more levels can be equally possible with respect to time, frequency, and sequences.

The transmit power, although being at parameter of the RA message transmission may not be used by the gNB to reliably distinguish one PRACH resource from another. As mentioned before, the transmit power can be used to prioritize one random access procedure compared to another random access procedure.

Similarly, the frequency bandwidth available for the PRACH transmission could be e.g., divided into frequency ranges to be differentiated for the purpose of random access prioritization. On the other hand, different time instances (e.g., subframes within a radio frame) could be used to differentiate the transmission of the random access message for the purpose of the random access prioritization.

In LTE there are defined 64 different preamble sequences, and way more than 64 preamble sequences may be defined in the future for 5G NR. Consequently, certain preamble sequences could be reserved for certain prioritization criteria (or for combination thereof), or several preamble sequences can be grouped together to be associated with a prioritization criteria (or for combination thereof).

According to one example, differentiation of the PRACH resources could be based on only the frequency of the radio resources used for transmitting the first random access message, such that certain frequencies or frequency ranges are unambiguously associated/reserved with certain prioritization criteria (such as one or more random access events). In a further similar example, differentiation of the PRACH resources could be based on only the time of the radio resources used for transmitting the first random access message, such that certain time instances are unambiguously associated/reserved with certain prioritization criteria (such as one or more random access events). As a further example, differentiation of the PRACH resources could be based on only the preamble sequences transmitted with the first random access message, such that one or more preamble sequences are unambiguously associated/reserved with certain prioritization criteria (such as one or more random access events).

Although the above examples differentiate the PRACH resources based on only one of the dimensions, it is equally possible that different combinations of the dimensions are suitably defined so as to differentiate the PRACH resources. This would be especially beneficial in those cases where we have a fine differentiation of the prioritization criteria. In that case in order to allow many different prioritization's, the differentiation of the PRACH resources could use more than one dimension. For instance, it might be possible to that certain groups of preamble sequences within certain frequency ranges are associated to a combination of prioritization criteria (such as random access events combined with use the services). Another exemplary definition of the PRACH resource division is that a set of PRACH resources e.g., reserved for a particular random access event (such as event 2, RRC Connection Re-establishment) is further subdivided based on the user service (e.g., differentiating all or only one or two of the three user services currently defined). Consequently, the thus defined sub-sets of PRACH resources would each be associated to a combination of random access event(s) and user service(s).

Moreover, the random access can be prioritized on several different criteria or any combination thereof, including the following:
 a random access event, triggering the transmission of a random access message,
 a user service currently used by the user equipment, wherein the user service is one of a massive machine-type communication, mMTC, an enhanced mobile broadband, eMBB, and an ultra-reliable low-latency communication, URLLC,
 a contractual arrangement under which the user equipment is being operated by a user, such as respective quality of service requirements to be fulfilled,
 a subcarrier spacing defining the frequency distance between two contiguous subcarriers.

For example, a random access procedure triggered by certain random access events can be prioritized over a random access procedure triggered by other random access event(s). One example would be that RA event 1 (i.e., the initial access for a UE in RRC_IDLE state) could be prioritized lower than e.g., RA event 4 (i.e., downlink data arrival), by e.g., having a high (large) backoff parameter and/or a low transmit power. Similarly, RA event 2 (RRC Connection Re-establishment) could be also prioritized over RA event 1. For instance, all or only some of the RA events can be differentiated between one another for the RA prioritization. Another example is that random access events 6 and 7 could be prioritized higher irrespective of the user services. According to another example for a certain user service, such as URLLC, random access events 2, 3, 4 have higher priority while random access event has a low priority. According to another example for a certain user service, such as eMBB, random access events 2 and 3 have a high priority while random access events 4 and 5 have a low priority. According to another example, random access event 1 may have a low priority, even irrespective of the user service for which the random access procedure is performed.

Moreover, prioritization of the random access procedure can be based on the user service, i.e., whether data communication by the UE is currently done for either URLLC, eMBB or mMTC. As explained in detail in previous pages, each user service is suited to different data transmission scenarios with different requirements; e.g., URLLC requiring very small delays, eMBB although not being delay-critical requiring high peak data rates etc. Random access procedures for URLLC could thus be prioritized over random access procedures for eMBB or mMTC, in order to facilitate meeting the delay requirements of the URLLC user service provided to the UE. For instance, all or only some of the user services can be differentiated between one another for the RA prioritization.

A user equipment is typically operated under a contract of the user with a network operator which can influence the general provision of user services to that UE compared to other UEs. For instance, premium users, typically paying more for their contract, might be serviced with a higher Quality of Service than standard users that correspondingly pay less money for their contract. This could also influence the priority with which the random access procedure is conducted between the UE and the gNB. For instance, the backoff time value used for random access procedures for a premium UE could be shorter than for random access procedures for a normal UE and/or the transmit power used for the random access message transmission could be higher. For instance, all or only some of the possible contractual arrangements can be differentiated between one another for the RA prioritization. QoS parameters for users may e.g., be exchanged between an MME and gNB via the S1 interface (for example, using an S1AP Initial Context Setup Request, similar or same as already defined in TS 36.413 clause 8.3.1.2). Hence, the gNB knows the QoS value for the UE. When UE sends the RACH request message, the gNB is thus able to check the QoS parameters and, based on this QOS, calculates a suitable back-off value for the UE. For high QoS (premium user), the gNB sets a low backoff parameter while for a general/standard user, the gNB sets a high backoff parameter.

The subcarrier spacing may or may not have a direct relationship with the user service. As explained in previous pages, different numerologies, with different subcarrier spacings, are currently being defined for the different user services that shall be supported by 5G NR systems. A subcarrier spacing of 15 kHz is currently envisioned for mMTC, a subcarrier spacing of 30 kHz is currently envisioned for eMBB, and a subcarrier spacing of 60 kHz is currently envisioned for URLLC. However, more than one subcarrier spacing can be used for a particular user service too. Instead of or in addition to the user-service-based prioritization, random access procedures could also be prioritized based on which subcarrier spacing is used for transmitting the first random access message. A subcarrier spacing of 60 kHz, with a very short symbol duration, could be prioritized higher than a 15 kHz subcarrier spacing having a comparatively long symbol duration. For instance, all or only some of the possible subcarrier spacings can be differentiated between one another for the RA prioritization.

The above list of criteria is not exhaustive, and further criteria, not explicitly mentioned above, could also be used to implement the discussed random access prioritization.

Although random access prioritization can be based on each of these single criteria alone, any meaningful combination thereof could also serve to prioritize random access procedures between one another. Only a few examples of possible combinations will be described in the following, while it should be clear to the reader that—even when not being explicitly mentioned—other combinations of criteria are equally possible.

For instance, a combination of certain random access event(s) for certain user service(s) could be used to distinguish the RA prioritization. For instance, for a specific user service, such as URLLC or eMBB, random access prioritization can be further distinguished based on the random access event that triggered the transmission of the random access message (i.e., triggered the random access procedure). According to one example, even when referring to the same service eMBB, random access prioritization for RA events 2 (RRC Connection Re-establishment procedure) and 3 (Handover) could be different from RA events 4 and 5 (respectively downlink and uplink data arrival in a non-synchronized state).

Moreover, although mentioned above, it is not strictly necessary that all the different prioritization criteria can be unambiguously distinguished, rather certain prioritization criteria can be grouped such that only the group of prioritization criteria can be distinguished on the gNB side. For instance, several random access events can be grouped together (such as random access events 2, 3, 4, 5), possibly on the assumption that the priority for a corresponding random access procedure would be similar. By grouping certain prioritization criteria the number of necessary different sets of PRACH resources is reduced, since less prioritization criteria (or combination thereof) have to be distinguished overall. Another example would be to group different contractual arrangements together as necessary, e.g., a premium user together with a prioritized user or user under a company in contrast to a standard user.

One general concept underlying the first embodiment is to provide the gNB with more detailed information on the random access procedure and the communicating UE in an efficient manner so as to allow prioritization to be controlled by the gNB. Instead of using additional bits to convey certain information to the gNB, the set of available PRACH resources is divided such that the UE selects PRACH resources in accordance with the triggered random access procedure and/or the UE, and then the gNB can deduce information from the selected PRACH resources used by the UE to transmit the first RA message. Put differently, in order to be able to differentiate between these different prioritization criteria and combinations thereof, the UE is to use different PRACH resources (i.e., the parameters for the transmission of the first random access message) for the transmission of the first random access message. The gNB is able to distinguish the PRACH resources used by the UE and thus to determine the prioritization criteria involved for that particular random access procedure. According to one example, for each different random access event that triggered the transmission of the RA message, the UE first determines and then uses different PRACH resources (e.g., a different frequency or timing), thereby allowing the gNB to unambiguously determine which random access event triggered the random access procedure by the UE.

The necessary information (e.g., termed random access configuration information) how the UE should select appropriate PRACH resources based on the prioritization criteria and conversely how the gNB determines the prioritization criteria from the selected PRACH resources is available at both the UE and the gNB. One possible way would be that the necessary information is defined by a 3GPP technical specification, thus effectively being hard-coded into the operating system of the UE. There would be no need to exchange information in said respect between the UE and the gNB. However, this would not allow great flexibility in how to prioritize random access procedures.

Another possible way is that the gNB provides the necessary information to the UE, e.g., within system information. This would also involve the benefit that the PRACH parameterization (i.e., differentiation of PRACH resources) could be cell specific and thus could change from cell to cell. Correspondingly, when the UE moves from a source gNB to a target gNB, the new PRACH configuration information would be received by the UE either via the system information in the new radio cell or already via the RRC Connection Reconfiguration message.

As currently and provisionally envisioned in 5G (see also previous explanation is), system information can be provided in either minimum SI, and/or other SI and/or on-demand SI messages but could also be provided in dedicated RRC messages directly addressed to UE(s). Consequently, any of these messages or a combination thereof can be used to convey the RA configuration information to the UE. For instance, either all of or just part of the random access configuration information can be provided to the UEs in the radio cell, using the minimum SI message, while the remaining part of the random access configuration information can be provided to the UEs in the radio cell using e.g., the other SI, the on-demand SI, or UE-specifically within an RRC message destined to the UE. In a further variant, RA configuration information to enable important prioritization (e.g., for RA event 1, initial access) could be transmitted in the minimum SI, while RA configuration information for less important prioritization can be provided differently to the UEs. For example, the RA configuration information for random access events 2, 5, and 6 are conveyed by on-demand system information. On the other hand, for example, the RA configuration information for RA events 4 and 7 (where low latency is required) can be conveyed by dedicated RRC messages (such as the RRC Connection Re-Configuration message).

This would reduce the overhead incurred by the minimum system information transmissions, which are assumed to occur periodically and rather frequently. Moreover by using e.g., the on-demand system information or even dedicated RRC messages, it is possible to provide different configuration information to different UEs and thus possibly to implement UE-specific prioritization.

In one exemplary variant, the random access configuration information in the UE and the gNB should be defined such that for every possible triggered random access procedure, the UE can derive which PRACH resources should be used, and the gNB conversely may derive from the used PRACH resources whether and how the random access procedure should be prioritized. On the other hand, the UE could simply use default or common PRACH resources in other cases not or not yet covered by the available random access configuration information.

In this embodiment, the UE, when performing the improved random access procedure, could simply determine the transmit power without reference to any of the prioritization criteria mentioned above. This would resemblance how the current LTE RACH procedure works.

On the other hand, random access prioritization according to the first embodiment is additionally or independently further implemented by determining in the UE an appropriate transmit power to be used for transmitting the first RA message of the RA procedure. When determining the RA transmission parameters in the UE, the UE needs to determine with how much radio power the RA message is to be transmitted. This determination can be done based on any of the above-mentioned prioritization criteria or combination thereof in a manner similar to how the UE determines the PRACH resources (to be distinguishable by the UE). A corresponding transmit power table could be provided in the UE associating certain transmit power values with certain prioritization criteria, thus allowing the UE to determine for each triggered random access procedure a suitable transmit power to be used when transmitting the first RA message of the RA procedure.

One simple and exemplary transmit power table that implements prioritization only based on the random access events is as follows.

| | Power ramping parameters | |
|---|---|---|
| Event 1 | Events 2, 3, 4, 5 | Event 6 and 7 |
| −120 dbm | −104 dbm | −100 dbm |

Another simple and exemplary transmit power table that implements prioritization only based on the user service is as follows:

| | Power ramping parameters | |
|---|---|---|
| eMBB (15 kHz) | URLLC (30 kHz) | mMTC (60 kHz) |
| −120 dbm | −112 dbm | −108 dbm |

A more detailed transmit power table that distinguishes some specific combinations of random access events, user services, and contractual situations is as follows.

| | | Power ramping parameters | | | |
|---|---|---|---|---|---|
| Event 6, 7 for all services | Event 2, 3, 4, 5 for URLLC | Event 2, 3 for eMBB | Event 4, 5 for eMBB | Event 1 for premium user | Event 1 for all services |
| −100 dbm | −104 dbm | −108 dbm, | −112 dbm | −116 dbm | −120 dbm |

As apparent from the above table, different user services (e.g., URLLC and eMBB) may thus have different transmit power parameters for the same RA event (e.g., RA event 2 and 3).

In a further alternative, instead of associating the power parameters with certain prioritization criteria, the power ramping parameters could be associated to respective set of PRACH resources (which in turn are associated to certain prioritization criteria).

The necessary information of the transmit power table is to be available in the UE. There are several options on how this can be achieved. As explained in a similar manner for the backoff index table (see details there), the transmit power table may be e.g., defined in a 3GPP technical specification or be transmitted to the UE by the gNB, for instance using system information broadcast in the radio cell of the gNB. The transmit power table could be provided either in the minimum SI, and/or other SI, and/or on-demand SI messages and/or in dedicated RRC messages directly addressed to the UE(s). Consequently, any of these messages or a combination thereof can be used to convey the RA configuration information to the UE.

Increasing the transmit power for the random access message transmission, as already known from LTE, could also be implemented according to a further variant of this embodiment. Specifically, transmit power may be increased successively with each failed RA message transmission, e.g., based on a given transmit power step size. In the above case and exemplarily assuming a random access procedure for RA event 1, the UE would thus begin transmitting the first RA message with a transmit power according to −120 dbm, and in case of random access failure, the UE would for the second try of transmitting the RA message use (assuming a 4 db step size) a transmit power according to −116 dbm, then −112 dbm for the third try, etc.

Figure 10:
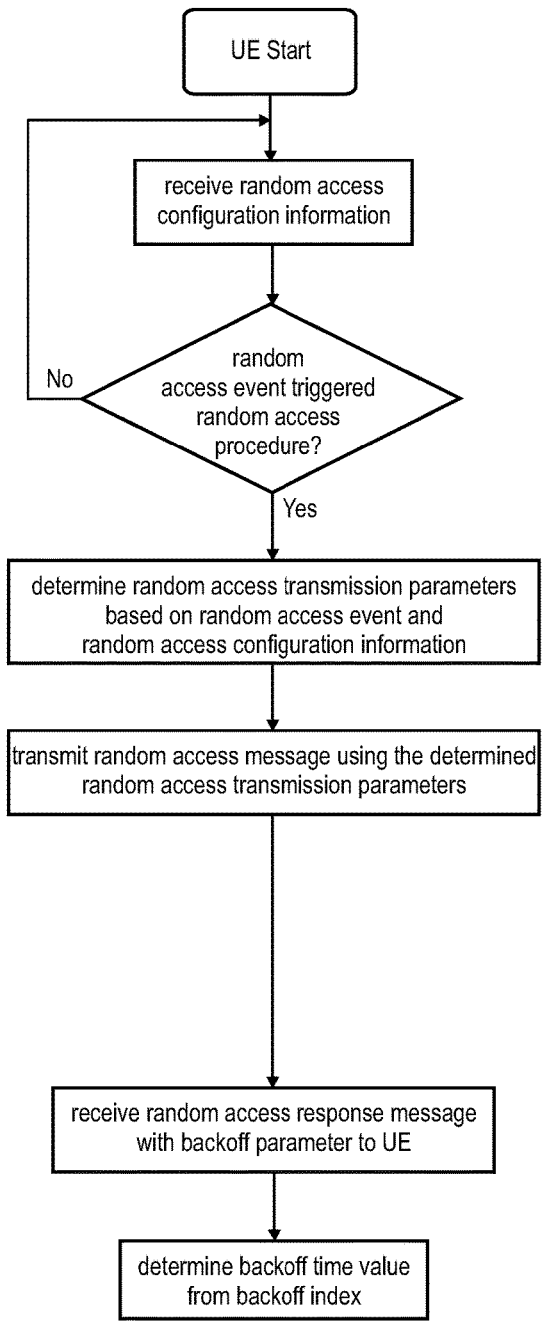
FIGS. 10 and 11 are sequence diagrams of respectively the UE and base station behavior according to one variant of the first embodiment.
Figure 11:
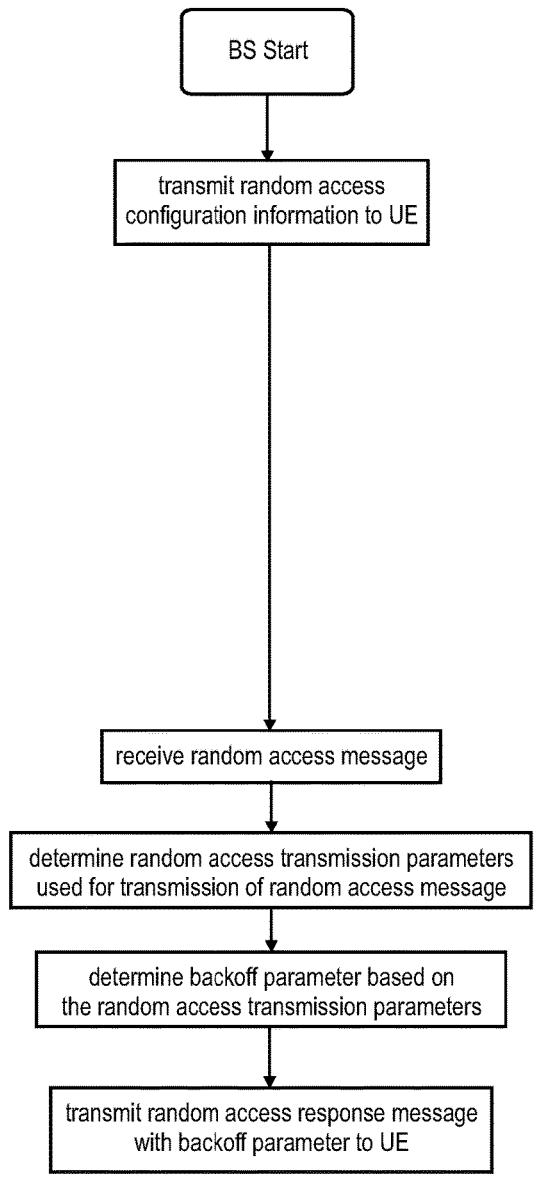

A simplified and exemplary illustration of the UE behavior for participating in the improved random access procedure of this embodiment and variants thereof as explained herein is presented in FIG. 10 in form of a sequence diagram. Further, a corresponding simplified and exemplary illustration of the gNB behavior for participating in the improved random access procedure of this embodiment and variants thereof as explained herein is presented in FIG. 11 in form of a sequence diagram. Only for the sake of facilitating illustration, it is exemplarily assumed that the prioritization of the random access procedure is based on the random access event alone. A further exemplary assumption is that the UE is receiving suitable random access configuration information from the base station in accordance with any of the examples given above. It is then further assumed that eventually the random access procedure will be triggered in the UE by any of the plurality of random access events. Based on the previously received RA configuration information and taking into consideration the random access event triggering the random access procedure, the UE may then determine corresponding random access transmission parameters (also see one of the various examples above, for example, distinguishable by frequency only) that are then used by the UE to transmit the first random access message to the gNB.

The gNB correspondingly receives the random access message from the UE and, based on the used random access transmission parameters and based on the corresponding random access configuration information, is able to determine which random access event triggered the random access procedure (i.e., the transmission of the random access message). Depending on the random access event and on the priority associated thereto, the gNB will determine the backoff parameter accordingly and, within the random access response message, provides said determined backoff parameter to the UE.

As briefly mentioned before, the gNB selects a suitable backoff parameter based on the random access transmission parameters and provides the selected backoff parameter to the UE using the random access response message. One possibility to transmit the backoff parameter is to reuse the corresponding backoff parameters defined for the LTE RACH procedure, according to which the backoff index can be encoded with 4 bits thus allowing for 16 different backoff indexes. The current definition is provided in 3GPP TS 36.321 v14.3.0 section 7.2 and is illustrated in the following:

| Index | Backoff Parameter value (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |

-continued

| Index | Backoff Parameter value (ms) |
|---|---|
| 11 | 480 |
| 12 | 960 |
| 13 | Reserved |
| 14 | Reserved |
| 15 | Reserved |

As apparent therefrom, backoff index values 13, 14 and 15 are currently reserved and could instead be used to encode very low backoff values, such as 0.5 ms, 1 ms, 2 ms to allow further prioritization. A correspondingly adapted and exemplary backoff time table could be defined as follows:

| Index | Backoff Parameter value (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 0.5 |
| 14 | 1 |
| 15 | 2 |

For instance, the gNB can indicate 0.5 ms, 1 ms, or 2 ms e.g., when the random access is triggered by the random access event 5 and for URLLC. A higher backoff parameter value (e.g., 10 ms) can be instructed by the gNB, e.g., when the random access is triggered by the random access event 5 and for eMBB.

On the other hand, instead of reusing the backoff index definition of LTE, a completely different backoff time table can be defined for 5G NR, also using more or less than 4 bits to encode the backoff index.

According to further variants of this embodiment, the selection of the PRACH resources can also be based on the subcarrier spacing that the gNB should use for transmitting the random access response message. In more detail, a UE in connected state monitors usually the PDCCH/PDSCH using a corresponding subcarrier spacing (e.g., depending on the user service, as explained above) and upon transmitting the first random access message monitors radio resources during the RAR receiving window in order to receive the random access response message from the gNB. Usually, the random access response message is transmitted by the gNB using a reference numerologies, thus a reference subcarrier spacing, irrespective of the user service the UE is currently using. In such circumstances, the UE is thus required to process and monitor for two different numerologies at the same time, which would increase the UE complexity. In order to avoid this extra complexity, according to a further variant of the embodiment, information as to which subcarrier spacing is currently used by the UE can be provided to the gNB such that the gNB, instead of using the reference numerologies, uses the corresponding same numerology for transmitting the random access response message to the UE.

Correspondingly, the PRACH resources available to transmit the random access message by the UE can further be divided based on the subcarrier spacing, such that by the UE using those specific PRACH resources, the gNB is able to deduce which subcarrier spacing it should use to transmit the random access response message. When in operation, the UE thus determines the PRACH resources based on the subcarrier spacing the gNB should use to transmit the random access response message, and transmits the random access message to the gNB using those determined PRACH resources.

This improved variant of the embodiment can be, for example, used for one of the random access events, such as event 4 or 5 related to the downlink and uplink transmission of data, where the UE is already connected and may be already communicating based on a numerologies (i.e., subcarrier spacing) different from the reference numerology (i.e., reference subcarrier spacing). There is less need for an initial access by the UE, since the UE is then not in connected mode and thus not already monitoring based on a particular subcarrier spacing of a user service; in said case the gNB may use the reference numerology (i.e., the reference subcarrier spacing) to transmit the random access response message.

For instance, a set of PRACH resources reserved for random access event 4, is further subdivided based on the possible subcarrier spacings, thus creating three sub-sets for the combination of random access event 4 with respectively a subcarrier spacing of 15, 30 or 60 kHz.

In the same manner as explained already for the previous cases, the random access configuration information necessary to differentiate based on the subcarrier spacing explained above, can be provided to the UE e.g., using system information (e.g., minimum SI, other-SI, on-demand SI, dedicated RRC messages; for details refer to previous pages).

According to a further improved variant of the first embodiment, the prioritization of the random access procedure by using different backoff parameters can also be implemented in certain scenarios in the UE. In more detail, as explained above the gNB would select a suitable backoff parameter on the basis of the selected PRACH resources which are presumed to be indicative of the prioritization criteria on the UE side.

However as explained above, variants of the first embodiment allow to group certain prioritization criteria, such as certain random access events. In said exemplary case, it is not possible for the gNB to distinguish, based on used PRACH resources, the random access event within the group of random access events that actually triggered the random access procedure in the UE. In those cases however, prioritization of the random access procedure within a group of random access events could be accomplished on the UE side, which knows the actual random access event that triggered the random access procedure.

Correspondingly, the UE determines PRACH resources associated with the group of random access events that includes the random access event actually triggering the random access procedure. Subsequently, these determined PRACH resources are used by the UE to transmit the first random access message to the gNB, which in turn may derive from the used PRACH resources the corresponding group of random access events and thus determine a suitable backoff parameter. The dependent backoff parameter can then be conveyed to the UE using the random access response message.

According to this variant of the first embodiment, the UE may determine the actual backoff time value based on the received backoff parameter but further taking into account the actual random access event that triggered the random access procedure. The UE is thus able to further prioritize the random access procedure based on the actual random access event that triggered the random access procedure, in addition to any prioritization performed by the gNB.

A similar approach can also be used in scenarios where no PRACH resource differentiation is performed for certain prioritization criteria. For instance, in variant of the first embodiment prioritization of the random access procedure by the gNB should only be performed for certain prioritization criteria, such as certain random access events or user services. For other prioritization criteria, common PRACH resources are used by the UE which do not encode any further information and thus do not allow the gNB to derive any information therefrom. For those cases where no prioritization is possible on the gNB side, prioritization of the random access procedure can nonetheless be implemented on the UE side which already has the necessary information without the need to subdivide the PRACH resources to encode information to be transmitted to the gNB. For instance, random access procedures that are triggered by RA events 1 and 2 could use the common PRACH resources, while the random access procedures triggered by other random access events could use dedicated PRACH resources as explained in connection with the improved random access procedure above. If common PRACH resources are used by the UE, then, as explained above, according to one example, prioritization of the random access procedure could be accomplished on the UE side, which knows e.g., the prioritization criteria (such as the random access event and/or the user service) to be used, and thus can select a backoff parameter (and transmit power).

Embodiment 2

In the second embodiment a further implementation of random access procedure prioritization is described. Conceptually, the prioritization is handled as far as possible on the UE side, thus obviating the need to inform the gNB on the particulars of the triggered random access procedure, compared to the solution provided in embodiment 1. A similar approach was described in connection with one particular variant of the first embodiment.

Instead of differentiating between different PRACH resources (i.e., the random access transmission parameters) to provide the gNB with information on the prioritization criteria e.g., the random access event, it is initially assumed that the UE uses common PRACH resources to transmit the first random access message of a random access procedure to the gNB. This approach would then be the same or very similar to the current LTE random access procedure, in which all UEs perform the random access procedure with the same set of configured transmission parameters thereby not allowing the receiving side to distinguish, for example, between different random access events (different users may still be distinguished, though not identified, based on the preamble sequence transmitted with the random access message).

On the other hand, prioritization on the UE side can be implemented by distinguishing the prioritization criteria (as extensively discussed in embodiment 1; e.g., random access events, contractual arrangements, uses service, subcarriers spacing) and appropriately selecting the corresponding backoff time value and/or transmit power that reflects the priority associated with the corresponding prioritization criteria.

In more detail, for the second embodiment a backoff time table (can also be termed backoff index table) is used in the UE to allow implementation of the random access prioritization, the backoff time table associating different backoff time values with both a backoff index (which is received from the gNB) and corresponding prioritization criteria (or combination of prioritization criteria). In a similar manner as explained for embodiment 1, the prioritization of the random access procedure can be implemented based on several different criteria or any combination thereof, including the following:

a random access event, triggering the transmission of a random access message, a user service currently used by the user equipment, optionally wherein the user service is one of a massive machine-type communication, mMTC, an enhanced mobile broadband, eMBB, and an ultra-reliable low-latency communication, URLLC, a contractual arrangement under which the user equipment is being operated by a user, such as respective quality of service requirements to be fulfilled, a subcarrier spacing defining the frequency distance between two contiguous subcarriers.

Further details on the different criteria were already presented in connection with embodiment 1, and in order to avoid repetitions, the reader is referred to these sections of the description relating to embodiment 1. In one example, the MME configures QoS parameter to UE (for example: using a NAS Attach Accept message, as already defined in 3gpp TS 24.301 clause 5.5.1.2.2). Based on the QoS value (i.e., reflecting a contractual arrangement), the UE calculates a backoff value and/or a power ramping parameter from the table, as explained further. For instance, a premium user UE uses higher power ramping parameter and lower backoff value than general user UE.

Correspondingly, different backoff time values could be appropriately associated with prioritization criteria (or a combination thereof) so as to reflect the respective priority associated therewith. A simple example of a backoff index table is presented below, distinguishing the backoff time values based on the received backoff index value ("index" in table exemplarily between 0 and 15) and on the basis of the random access event that triggered the random access procedure during which the backoff index is received from the gNB.

| | Backoff time value (ms) | | |
|---|---|---|---|
| Index | Event 1 | Event 2, 3, 4, 5 | Event 6 and 7 |
| 0 | 0 | 5 | 10 |
| 1 | 5 | 10 | 15 |
| 2 | 10 | 15 | 20 |
| 3 | 15 | 20 | 25 |
| 4 | . . . | . . . | . . . |
| 5 | . . . | . . . | . . . |
| . . . | . . . | . . . | . . . |
| 15 | . . . | . . . | . . . |

One more complex example of the backoff index table is presented below.

| | Backoff time value (ms) | | | | |
|---|---|---|---|---|---|
| Index | Event 6 and 7 for all services | Event 2, 3, 4, 5 for URLLC | Event 2, 3 for eMBB | Event 4, 5 for eMBB | Event 1 for premium user | Event 1 for all services |
| 0 | 0 | 2 | 4 | 6 | 8 | 10 |
| 1 | 5 | 7 | 9 | 11 | 13 | 15 |
| 2 | 10 | 12 | 14 | 16 | 18 | 20 |
| 3 | ... | ... | ... | ... | ... | ... |
| 4 | ... | ... | ... | ... | ... | ... |
| 5 | ... | ... | ... | ... | ... | ... |
| ... | ... | ... | ... | ... | ... | ... |
| 15 | ... | ... | ... | ... | ... | ... |

As apparent from the above table, different user services (e.g., URLLC and eMBB) may thus have different backoff time values for the same RA event (e.g., RA event 2 and 3).

As apparent from the above exemplary backoff time table, the backoff index table in this case allows defining a range of the backoff time value based on the backoff index the received from the gNB (e.g., from 0 to 10 ms for index 0), while the UE, based on the prioritization criteria (e.g., random access event, user service, contractual arrangement) selects the suitable backoff time value within a set range (e.g., 4 ms in case of RA event 2 and eMBB). Thus, using the backoff index table it is possible to prioritize the random access procedure by the UE for certain RA events or user services (or combinations thereof) etc.

The necessary information on the backoff index table can be provided to the UE in different ways, as explained in a similar manner for the random access configuration information of the first embodiment. Correspondingly, one possible way would be that the necessary information is defined by a 3GPP technical specification, thus effectively being hard-coded into the operating system of the UE. Another possible way is that the gNB provides the necessary information on the backoff index table to the UE, e.g., within system information. As currently and provisionally envisioned in 5G, system information can be provided in either minimum SI, and/or other SI and/or on-demand SI messages and/or in dedicated RRC messages directly addressed to the UE(s). Consequently, any of these messages or a combination thereof can be used to convey backoff index table information to the UE.

Figures 12, 13:
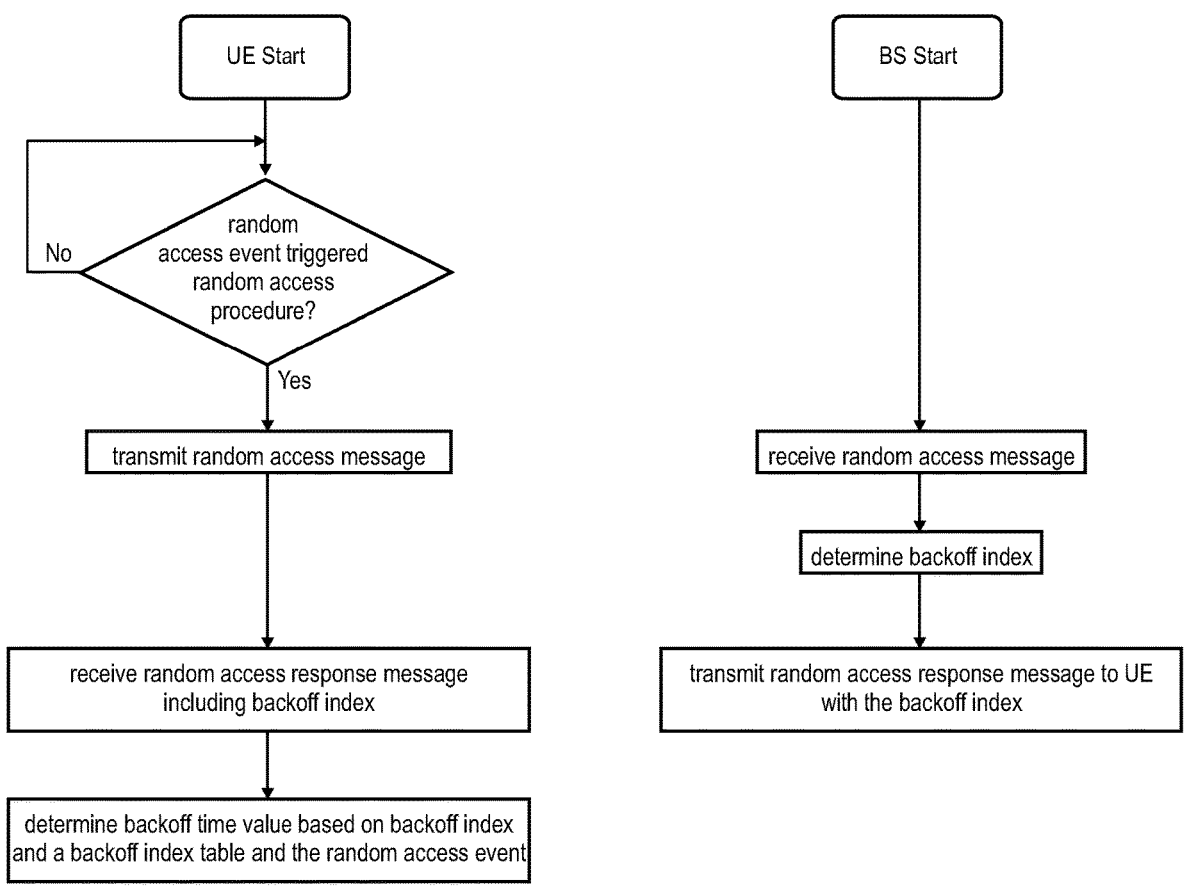
FIGS. 12 and 13 are sequence diagrams of respectively the UE and base station behavior according to one variant of the second embodiment.

A simplified and exemplary illustration of the UE behavior for participating in the improved random access procedure of this second embodiment and variants of thereof as explained herein is presented in FIG. 12 in form of a sequence diagram. Further, a corresponding simplified and exemplary illustration of the gNB behavior for participating in the improved random access procedure of this embodiment and variants of thereof as explained herein is presented in FIG. 13 in form of a sequence diagram.

As apparent therefrom, it is assumed that a random access procedure will be eventually triggered in the UE, thus triggering the transmission of the first random access message from the UE to the gNB. In contrast to the core concept of embodiment 1, explained above, common PRACH resources are used by the UE to transmit the triggered random access message to the gNB, i.e., using PRACH resources (i.e., time and frequency of radio resources, preamble sequence, also in one option the transmit power as explained below, see also FIG. 9) without reference to any of the prioritization criteria (such as RA event, user service, subcarrier spacing, contractual arrangement).

In turn, the base station, receiving the random access message, will then determine in a usual manner a backoff index (see e.g., LTE RACH procedure, as explained before), and the determined backoff index is then conveyed to the UE as part of the random access response (RAR) message. Based on this received backoff index, the UE can then determine the actual backoff parameter value using the backoff time table as explained above additionally taking into consideration the prioritization criteria (such as a random access event, and/or user service, and/or contractual arrangement, and/or subcarrier spacing).

In a similar or same manner as for the first embodiment, the UE, when performing the improved random access procedure according to this second embodiment, could simply determine the transmit power without reference to any of the prioritization criteria mentioned above. This would resemble how the current LTE RACH procedure works.

On the other hand, random access prioritization according to the second embodiment can be additionally or independently further implemented by determining in the UE an appropriate transmit power to be used for transmitting the first RA message of the RA procedure. When determining the RA transmission parameters in the UE, the UE needs to determine with how much radio power the RA message is to be transmitted. This determination can be done based on any of the above-mentioned prioritization criteria or combination thereof in a manner similar to how the UE determines the backoff time value. A corresponding transmit power table could be provided in the UE associating certain transmit power values with certain prioritization criteria, thus allowing the UE to determine for each triggered random access procedure a suitable transmit power to be used when transmitting the first RA message of the RA procedure.

As explained in connection with the first embodiment, one simple and exemplary example of a transmit power table that implements prioritization only based on the random access events is as follows.

| Power ramping parameters | | |
|---|---|---|
| Event 1 | Events 2, 3, 4, 5 | Event 6 and 7 |
| −120 dbm | −104 dbm | −100 dbm |

Another simple and exemplary transmit power table that implements prioritization only based on the user service is as follows:

| Power ramping parameters | | |
|---|---|---|
| eMBB (15 kHz) | URLLC (30 kHz) | mMTC (60 kHz) |
| −120 dbm | −112 dbm | −108 dbm |

A more detailed transmit power table that distinguishes some specific combinations of random access events, user services, and contractual situations is as follows.

| Power ramping parameters | | | | | |
|---|---|---|---|---|---|
| Event 6 and 7 for all services | Event 2, 3, 4, 5 for URLLC | Event 2 and 3 for eMBB | Event 4 and 5 for eMBB | Event 1 for premium user | Event 1 for all services |
| −100 dbm | −104 dbm | −108 dbm, | −112 dbm | −116 dbm | −120 dbm |

As apparent from the above table, different user services (e.g., URLLC and eMBB) may thus have different transmit power parameters for the same RA event (e.g., RA event 2 and 3).

The necessary information of the transmit power table is to be available in the UE. There are several options on how this can be achieved. As explained in a similar manner for the first embodiment, the transmit power table may be e.g., defined in a 3GPP technical specification or be transmitted to the UE by the gNB, for instance using system information broadcast in the radio cell of the gNB. The transmit power table could be provided either in the minimum SI, and/or other SI, and/or on-demand SI messages and/or in dedicated RRC messages directly addressed to the UE(s). Consequently, any of these messages or a combination thereof can be used to convey the RA configuration information to the UE.

Increasing the transmit power for the random access message transmission, as already known from LTE, could also be implemented according to a further variant of this second embodiment. Specifically, transmit power is increased successively with each failed RA message transmission, e.g., based on a given transmit power step size. In the above cases and exemplarily assuming a random access procedure for RA event 1, the UE would thus begin transmitting the first RA message with a transmit power according to −120 dbm, and in case of random access failure, the UE would for the second try of transmitting the RA message use a transmit power according to −116 dbm, then −112 dbm for the third try, etc.

In the present embodiment 2, using different transmission powers for the RA message transmission in order to prioritize the random access procedure is particularly beneficial in view of that no differentiation of PRACH resources occur. Thus, the possibility of collisions with other UEs during the random access remains high, compared to the improved random access procedure of embodiment 1 according to which different PRACH resources are used for different prioritization criteria. Increasing transmission power, e.g., for certain important random access events (e.g., random access event 2—RRC Connection Re-Establishment), increases the chances that the random access procedure for that important random access event succeeds compared to random access procedures that are triggered in another UE by a less important random access event (e.g., Random access event 1—initial access).

Further Aspects

According to a first aspect, a user equipment is provided comprising a processor, which upon being triggered by one of a plurality of random access events, determines random access transmission parameters to be used for transmitting a random access message to a base station that controls a radio cell of a mobile communication system in which the user equipment is located. At least part of the random access transmission parameters are determined based on the random access event that triggered the transmission of the random access message and on random access configuration information The random access configuration information associates each of a plurality of random access events with a set of random access transmission parameters among a plurality of random access transmission parameters usable by the user equipment to transmit a random access message to the base station. A transmitter of the UE transmits the random access message to the base station using the determined random access transmission parameters.

According to a second aspect provided in addition to the first aspect, the plurality of random access transmission parameters comprise at least one or more of:
  a random access preamble sequence, transmitted with the random access message,
  time and frequency of radio channel resources, to be used by the user equipment when transmitting the random access message to the base station,
  a transmit power value, to be used by the user equipment when transmitting the random access message to the base station, In addition or alternatively, the part of the random access transmission parameters is associated to one of or a combination of two or more of the following:
  a random access event, triggering the transmission of a random access message,
  a user service currently used by the user equipment, optionally wherein the user service is one of a massive machine-type communication, mMTC, an enhanced mobile broadband, eMBB, and an ultra-reliable low-latency communication, URLLC,
  a contractual arrangement under which the user equipment is being operated by a user, such as respective quality of service requirements to be fulfilled,
  a subcarrier spacing defining the frequency distance between two contiguous subcarriers.

According to a third aspect provided in addition to the first or second aspect, one part of the random access transmission parameters is associated with a combination of one or more of the random access events and one or more of the user services. In addition or alternatively, another part of the random access transmission parameters is associated with a combination of one or more of the random access events and one contractual arrangement. In addition or alternatively, the association between random access transmission parameters and the plurality of random access events is such that each random access event is associated with different random access transmission parameters.

According to a fourth aspect provided in addition to any of first to third aspects, a receiver of the UE receives the random access configuration information from the base station within system information broadcast by the base station in the radio cell. Alternatively, the receiver receives one part of the random access configuration information from the base station within minimum system information broadcast by the base station in the radio cell and receives another part of the random access configuration information in a dedicated message transmitted from the base station and addressed to the user equipment or receives the another part of the random access configuration information in further system information. This further system information is transmitted by the base station in the radio cell on demand. As a further option, the one part of the random access configuration comprises information on the association of one or more important random access event with a respective set of random access transmission parameters.

According to a fifth aspect provided in addition to any of the first to fourth aspects, the processor determines a transmit power value based on the random access event that triggered the transmission and on the random access configuration information. The transmitter transmits the random access message based on the determined transmit power value.

According to a sixth aspect provided in addition to any of the first to fifth aspects, the receiver receives from the base station, in response to the transmitted random access message, a random access response message including a backoff parameter to be used by the user equipment to determine a period of time the user equipment has at least to wait before starting another random access channel procedure. According to one option, the backoff parameter is determined by the base station for the user equipment based on the random access message transmitted by the user equipment to the base station and based on the random access configuration information.

According to a seventh aspect provided in addition to any of the first to sixth aspects, the processor determines, based on the random access configuration information, random access transmission parameters associated with a subcarrier spacing, which is to be used by the base station to transmit a random access response message to the user equipment. The transmitter transmits the random access message to the base station using the determined random access transmission parameters. The receiver monitors radio resources for incoming data transmission and a random access response message based on the subcarrier spacing on which basis the processor determined the random access transmission parameters. The receiver receives the random access response message from the base station based on the subcarrier spacing on which basis the processor determined the random access transmission parameters.

According to an eighth aspect provided in addition to any of the first to seventh aspects, the association between random access transmission parameters and the plurality of random access events is such that some but not all of the plurality of random access events are associated with different random access transmission parameters and such that the remaining random access events are associated with common random access transmission parameters. The processor upon being triggered by one of the remaining random access events, determines the common random access transmission parameters. The transmitter transmits a second random access message to the base station using the determined common random access transmission parameters. The receiver receives from the base station, in response to the transmitted second random access message, a second random access response message including a backoff index. The processor determines a backoff time value, indicating a period of time the user equipment has at least to wait before starting another random access channel procedure, based on the received backoff index and on a backoff index table, which associates different backoff time values with backoff indexes and with the remaining random access events that may trigger the transmission of a random access message.

According to a ninth aspect provided in addition to the eighth aspect, the plurality of random access events comprise one or more of:
  Initial access from RRC_IDLE;
  Connection re-establishment procedure;
  Handover;
  Downlink data arrival that requires the user equipment to perform a random access channel procedure;
  Uplink data arrival that requires the user equipment to perform a random access channel procedure;
  State transition from an inactive state to a connected state;
  Recovery from a beam failure.

In addition or alternatively, the random access message is transmitted as the first message of a Random Access Channel, RACH, procedure performed by the user equipment with the base station. In one option, the RACH procedure consists of four steps, and the user equipment packet duplication status is transmitted together with any signaling message of the RACH procedure. In another option, the RACH procedure consists of two steps, and the user equipment packet duplication status is transmitted together with a RACH preamble and a handover complete message of the RACH procedure.

According to a tenth aspect, a base station is provided comprising a receiver, which receives a random access message from a user equipment which is located in the radio cell of a mobile communication system controlled by the base station. The random access message being transmitted by the user equipment upon being triggered by one of a plurality of random access events. A processor of the base station determines random access transmission parameters used by the user equipment to transmit the random access message, and determines a backoff parameter to be used by the user equipment to determine a period of time the user equipment has at least to wait before starting another random access channel procedure. A transmitter of the base station transmits, in response to the transmitted random access message, a random access response message to the user equipment that includes the determined backoff parameter.

According to an eleventh aspect provided in addition to the tenth aspect, the transmitter broadcasts random access configuration information in its radio cell. The random access configuration information associates each of a plurality of random access events with a set of random access transmission parameters among a plurality of random access transmission parameters usable by the user equipment to transmit the random access message to the base station.

According to a twelfth aspect, a user equipment is provided comprising a transmitter, which upon being triggered by one of a plurality of random access events, transmits a random access message to a base station controlling a radio cell of a mobile communication system in which the user equipment is located. A receiver of the user equipment receives from the base station, in response to the transmitted random access message, a random access response message including a backoff index. A processor of the UE determines a backoff time value, indicating a period of time the user equipment has at least to wait before starting another random access channel procedure, based on the received backoff index and on a backoff index table, which associates different backoff time values with backoff indexes and with at least one or more of the plurality of random access events that may trigger the transmission of a random access message.

According to a thirteenth aspect provided in addition to the twelfth aspect, the backoff index table associates different backoff time values with one of or a combination of two or more of:
  a random access event, triggering the transmission of a random access message,
  a user service currently used by the user equipment, optionally wherein the user service is one of a massive machine-type communication, mMTC, an enhanced mobile broadband, eMBB, and an ultra-reliable low-latency communication, URLLC, a contractual arrangement under which the user equipment is being operated by a user, such as respective quality of service requirements to be fulfilled, a subcarrier spacing defining the frequency distance between two contiguous sub carriers.

In one option, the receiver receives the backoff index table within system information broadcast by the base station in the radio cell, or wherein the backoff index table is pre-stored in the operating system of the user equipment.

According to a fourteenth aspect provided in addition to any of the twelfth to thirteenth aspects, the processor determines random access transmission parameters for transmitting the random access message among a plurality of random access transmission parameters without reference to the random access event that triggered the transmission of the random access message. In one option, the plurality of random access transmission parameters includes one or more of:

a random access preamble sequence, transmitted with the random access message, time and frequency of radio channel resources, to be used by the user equipment when transmitting the random access message to the base station, a transmit power value, to be used by the user equipment when transmitting the random access message to the base station.

According to a fifteenth aspect provided in addition to any of the twelfth to fourteenth aspects, the processor determines a transmit power value for transmitting the random access message based on a transmit power index table. The transmit power index table associates respective transmit power values with one of or a combination of one or more of:

a random access event, triggering the transmission of a random access message, a user service currently used by the user equipment, optionally wherein the user service is one of a massive machine-type communication, mMTC, an enhanced mobile broadband, eMBB, and an ultra-reliable low-latency communication, URLLC, a contractual arrangement under which the user equipment is being operated by a user, such as respective quality of service requirements to be fulfilled, a subcarrier spacing defining the frequency distance between two contiguous sub carriers.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Further, the various embodiments may also be implemented by means of software modules, which are executed by a processor or directly in hardware. Also a combination of software modules and a hardware implementation may be possible. The software modules may be stored on any kind of computer readable storage media, for example, RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment comprising:

a processor, which in operation and upon being triggered by a random access event of a plurality of random access events, determines random access transmission parameters to be used for transmitting a random access message to a base station that controls a radio cell of a mobile communication system in which the user equipment is located, wherein at least part of the random access transmission parameters are determined based on the random access event and on random access configuration information, wherein the random access configuration information associates each of a plurality of random access events with a set of random access transmission parameters among a plurality of random access transmission parameters usable by the user equipment to transmit a random access message to the base station, and wherein the processor, when in operation, determines a transmit power value based on the random access event and on the random access configuration information, and a transmitter, which in operation, transmits the random access message to the base station using the determined random access transmission parameters, wherein the transmitter, when in operation, transmits the random access message based on the determined transmit power value.

2. The user equipment according to claim 1, wherein the plurality of random access transmission parameters comprise, in addition to the transmit power value, at least one or more of:
   a random access preamble sequence that is transmitted with the random access message; or
   time and frequency of radio channel resources that are used by the user equipment when transmitting the random access message to the base station.

3. The user equipment according to claim 1, wherein,
   one part of the random access transmission parameters is associated with a combination of one or more of the plurality of random access events and one or more of user services, and/or
   another part of the random access transmission parameters is associated with a combination of one or more of the plurality of random access events and one contractual arrangement, and/or
   the association between the random access transmission parameters and the plurality of random access events is such that each random access event is associated with different random access transmission parameters.

4. The user equipment according to claim 1, further comprising:
   a receiver, which in operation, receives the random access configuration information from the base station within system information broadcast by the base station in the radio cell,
   or
   a receiver, which in operation, receives one part of the random access configuration information from the base station within minimum system information broadcast by the base station in the radio cell and receives another part of the random access configuration information in a dedicated message transmitted from the base station and addressed to the user equipment or receives the another part of the random access configuration information in further system information transmitted by the base station in the radio cell on demand, wherein the one part of the random access configuration comprises information on the association of one or more important random access events with a respective set of random access transmission parameters.

5. The user equipment according to claim 4,
   wherein the receiver, when in operation, receives from the base station, in response to the transmitted random access message, a random access response message including a backoff parameter to be used by the user equipment to determine a period of time the user equipment has at least to wait before starting another random access channel procedure,
   wherein the backoff parameter is determined by the base station for the user equipment based on the random access message transmitted by the user equipment to the base station and based on the random access configuration information.

6. The user equipment according to claim 4, wherein
   the processor, when in operation, determines, based on the random access configuration information, random access transmission parameters associated with a subcarrier spacing, which is to be used by the base station to transmit a random access response message to the user equipment,
   the transmitter, when in operation, transmits the random access message to the base station using the determined random access transmission parameters,
   the receiver, when in operation, monitors radio resources for incoming data transmission and the random access response message based on the subcarrier spacing, and
   the receiver, when in operation, receives the random access response message from the base station based on the subcarrier spacing.

7. The user equipment according to claim 4, wherein
   the association between random access transmission parameters and the plurality of random access events is such that some but not all of the plurality of random access events are associated with different random access transmission parameters and such that the remaining random access events are associated with common random access transmission parameters,
   the processor, when in operation and upon being triggered by one of the remaining random access events, determines the common random access transmission parameters,
   the transmitter, when in operation, transmits a second random access message to the base station using the determined common random access transmission parameters,
   the receiver, when in operation, receives from the base station, in response to the transmitted second random access message, a second random access response message including a backoff index, and
   the processor, when in operation, determines a backoff time value, indicating a period of time the user equipment has at least to wait before starting another random access channel procedure, based on the received backoff index and on a backoff index table, which associates different backoff time values with backoff indexes.

8. The user equipment according to claim 1, wherein the plurality of random access events comprise one or more of:
   initial access from RRC_IDLE;
   connection re-establishment procedure;
   handover;
   downlink data arrival that requires the user equipment to perform a random access channel procedure;
   uplink data arrival that requires the user equipment to perform a random access channel procedure;
   state transition from an inactive state to a connected state; or
   recovery from a beam failure.

9. The user equipment according to claim 1, wherein at least part of the random access transmission parameters is associated with one or more of:
   a specific random access event;
   a user service currently used by the user equipment, wherein the user service is one of a massive machine-type communication (mMTC), an enhanced mobile broadband (eMBB), and an ultra-reliable low-latency communication (URLLC);
   a contractual arrangement under which the user equipment is being operated by a user; or
   a subcarrier spacing defining a frequency distance between two contiguous subcarriers.

10. A method performed by a user equipment, the method comprising:
   determining, upon being triggered by a random access event of a plurality of random access events, random access transmission parameters to be used for transmitting a random access message to a base station that controls a radio cell of a mobile communication system in which the user equipment is located, wherein at least part of the random access transmission parameters are determined based on the random access event and on random access configuration information, wherein the random access configuration information associates each of a plurality of random access events with a set of random access transmission parameters among a plurality of random access transmission parameters usable by the user equipment to transmit a random access message to the base station, transmitting the random access message to the base station using the determined random access transmission parameters, wherein a transmit power value is determined based on the random access event and on the random access configuration information, and the random access message is transmitted based on the determined transmit power value.

11. The method according to claim 10, wherein the plurality of random access transmission parameters comprise, in addition to the transmit power value, at least one or more of:

a random access preamble sequence that is transmitted with the random access message; or time and frequency of radio channel resources that are used by the user equipment when transmitting the random access message to the base station.

12. The method according to claim 10, wherein, one part of the random access transmission parameters is associated with a combination of one or more of the plurality of random access events and one or more of user services, and/or another part of the random access transmission parameters is associated with a combination of one or more of the plurality of random access events and one contractual arrangement, and/or the association between the random access transmission parameters and the plurality of random access events is such that each random access event is associated with different random access transmission parameters.

13. The method according to claim 10, further comprising:

receiving the random access configuration information from the base station within system information broadcast by the base station, or receiving one part of the random access configuration information from the base station within minimum system information broadcast by the base station and receiving another part of the random access configuration information in a dedicated message transmitted from the base station and addressed to the user equipment or receiving the another part of the random access configuration information in further system information transmitted by the base station on demand, wherein the one part of the random access configuration comprises information on the association of one or more important random access events with a respective set of random access transmission parameters.

14. The method according to claim 10, comprising:

receiving from the base station, in response to the transmitted random access message, a random access response message including a backoff parameter to be used by the user equipment to determine a period of time the user equipment has at least to wait before starting another random access channel procedure, wherein the backoff parameter is determined by the base station for the user equipment based on the random access message transmitted by the user equipment to the base station and based on the random access configuration information.

15. The method according to claim 10, comprising:

determining, based on the random access configuration information, random access transmission parameters associated with a subcarrier spacing, which is to be used by the base station to transmit a random access response message to the user equipment, transmitting the random access message to the base station using the determined random access transmission parameters, monitoring radio resources for incoming data transmission and the random access response message based on the subcarrier spacing, and receiving the random access response message from the base station based on the subcarrier spacing.

16. The method according to claim 10, wherein the association between random access transmission parameters and the plurality of random access events is such that some but not all of the plurality of random access events are associated with different random access transmission parameters and such that the remaining random access events are associated with common random access transmission parameters, the method further comprising:

determining, in response to being triggered by one of the remaining random access events, the common random access transmission parameters, transmitting a second random access message to the base station using the determined common random access transmission parameters, receiving from the base station, in response to the transmitted second random access message, a second random access response message including a backoff index, and determining a backoff time value, indicating a period of time the user equipment has at least to wait before starting another random access channel procedure, based on the received backoff index and on a backoff index table, which associates different backoff time values with backoff indexes.

17. The method according to claim 10, wherein the plurality of random access events comprise one or more of:

initial access from RRC_IDLE;

connection re-establishment procedure;

handover;

downlink data arrival that requires the user equipment to perform a random access channel procedure;

uplink data arrival that requires the user equipment to perform a random access channel procedure;

state transition from an inactive state to a connected state; or recovery from a beam failure.

18. The method according to claim 10, wherein at least part of the random access transmission parameters is associated with one or more of:

a specific random access event;

a user service currently used by the user equipment, wherein the user service is one of a massive machine-type communication (mMTC), an enhanced mobile broadband (eMBB), and an ultra-reliable low-latency communication (URLLC);

a contractual arrangement under which the user equipment is being operated by a user; or a subcarrier spacing defining a frequency distance between two contiguous subcarriers.

* * * * *